(12) United States Patent
Yamaoka et al.

(10) Patent No.: US 12,103,364 B2
(45) Date of Patent: Oct. 1, 2024

(54) AIR DISCHARGE DEVICE

(71) Applicant: DENSO CORPORATION, Kariya (JP)

(72) Inventors: Jun Yamaoka, Kariya (JP); Masaharu Sakai, Kariya (JP); Yuuji Okamura, Kariya (JP); Shogo Hayakawa, Kariya (JP); Yasuki Omori, Kariya (JP); Satoshi Takotani, Kariya (JP); Takashi Kaneko, Kariya (JP); Marie Nagahama, Kariya (JP); Yasuhiko Niimi, Kariya (JP); Yusuke Komatsubara, Kariya (JP); Takahito Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 1011 days.

(21) Appl. No.: 17/064,831

(22) Filed: Oct. 7, 2020

(65) Prior Publication Data

US 2021/0016634 A1    Jan. 21, 2021

Related U.S. Application Data

(63) Continuation of application No. PCT/JP2019/014659, filed on Apr. 2, 2019.

(30) Foreign Application Priority Data

Apr. 11, 2018  (JP) .................................. 2018-076325
Jul. 18, 2018  (JP) .................................. 2018-135299

(Continued)

(51) Int. Cl.
*B60H 1/34*       (2006.01)
*F24F 13/072*    (2006.01)

(52) U.S. Cl.
CPC ......... *B60H 1/3407* (2013.01); *B60H 1/3457* (2013.01); *F24F 13/072* (2013.01)

(58) Field of Classification Search
CPC ..... B60H 1/3407; B60H 1/3457; F24F 13/06; F24F 13/072; F24F 2013/0612
(Continued)

(56) References Cited

U.S. PATENT DOCUMENTS

2011/0039491 A1 *  2/2011  Khalifa .................. F24F 13/04
                                                                 454/305
2015/0300385 A1    10/2015  Akagi et al.

FOREIGN PATENT DOCUMENTS

CN    104769367 A    7/2015
JP    H08210943 A    8/1996
(Continued)

OTHER PUBLICATIONS

U.S. Appl. No. 17/065,045, filed Oct. 7, 2020, Jun Yamaoka, et al.
(Continued)

*Primary Examiner* — Allen R. B. Schult
(74) *Attorney, Agent, or Firm* — Harness, Dickey & Pierce, P.L.C.

(57) ABSTRACT

An air discharge device includes a duct that defines a flow passage through which a working air flow to be discharged passes, and a hole forming member defining an air discharge hole as an outlet of the working air flow. The hole forming member has a vortex generation structure configured to generate an auxiliary vortex having a vortex characteristic including a vortex rotation direction and a vortex axis direction. The vortex characteristic of the auxiliary vortex is different from that of a lateral vortex generated by the working air flow at a downstream side of the air discharge hole. The vortex generation structure is configured in the hole forming member so that the auxiliary vortex collides with the lateral vortex in a state where at least one of the
(Continued)

vortex rotation direction and the vortex axial direction of the vortex characteristic is different from that of the lateral vortex.

7 Claims, 26 Drawing Sheets

(30) Foreign Application Priority Data

Oct. 23, 2018 (JP) ................................ 2018-199383
Dec. 25, 2018 (JP) ................................ 2018-240807

(58) Field of Classification Search
USPC ....................................................... 454/152
See application file for complete search history.

(56) References Cited

FOREIGN PATENT DOCUMENTS

| | | | |
|---|---|---|---|
| JP | H08318176 A | | 12/1996 |
| JP | 2007255879 A | * | 10/2007 |
| JP | 2017116228 A | | 6/2017 |

OTHER PUBLICATIONS

U.S. Appl. No. 17/065,267, filed Oct. 7, 2020, Jun Yamaoka, et al.
Makito Sakai et al. Study on Flow Characteristics of a Plane Jet Perturbed by Tabs at the Slit Nozzle Exit. In: The Japan Society of Mechanical Fluid Engineering Division (Nov. 12-13, 2016, Ube) Copyright © 2016 Japan Society of Mechanical Engineers.

* cited by examiner

AIR DISCHARGE DEVICE

CROSS REFERENCE TO RELATED APPLICATIONS

The present application is a continuation application of International Patent Application No. PCT/JP2019/014659 filed on Apr. 2, 2019, which designated the U.S. and claims the benefit of priority from Japanese Patent Applications No. 2018-076325 filed on Apr. 11, 2018, Japanese patent application No. 2018-135299 filed on Jul. 18, 2018, Japanese patent application No. 2018-199383 filed on Oct. 23, 2018 and Japanese patent application No. 2018-240807 filed on Dec. 25, 2018, the entire contents of which are incorporated herein by reference.

TECHNICAL FIELD

The present disclosure relates to an air discharge device that discharges an air flow.

BACKGROUND

Conventionally, in order to increase a reaching distance of an air flow used as a working air flow, an air nozzle is known in which an auxiliary air outlet is provided around a main air outlet forming the working air flow, so as to form a support air flow that can reduce a suction of the air drawn into the working air flow.

SUMMARY

An object of the present disclosure is to provide an air discharge device that can suppress air suction action of a working air flow blown out of an air outlet and increase a reaching distance of the working air flow.

According to an aspect of the present disclosure, an air discharge device includes a duct that defines a flow passage through which a working air flow to be discharged toward a discharge target passes, and a hole forming member defining an air discharge hole as an outlet of the working air flow at a downstream side of the duct in an air flow direction. The hole forming member has a vortex generation structure configured to generate an auxiliary vortex having a vortex characteristic including a vortex rotation direction and a vortex axis direction. The vortex characteristic of the auxiliary vortex may be different from that of a lateral vortex generated by the working air flow at a downstream side of the air discharge hole. The vortex generation structure may be configured in the hole forming member so that the auxiliary vortex collides with the lateral vortex in a state where at least one of the vortex rotation direction and the vortex axial direction of the vortex characteristic is different from that of the lateral vortex.

According to another aspect of the present disclosure, an air discharge device includes a duct defining a flow passage in which a working air flow passes, a hole forming member defining an air discharge hole as a working air flow outlet at a downstream side of the duct in an air flow direction, and a vortex generation structure configured to generate an auxiliary vortex having a vortex characteristic including a vortex rotation direction and a vortex axis direction. The vortex characteristic of the auxiliary vortex may be different from that of a lateral vortex generated by the working air flow at a downstream side of the air discharge hole. The vortex generation structure may include a plurality of vortex generators that are arranged side by side along a peripheral edge of the hole forming member surrounding the air discharge hole. When the air passes around the vortex generators, the auxiliary vortex having a vortex characteristic different from at least one of the vortex rotation direction and a vortex axis direction of a lateral vortex can be generated.

Thus, it is possible to further increase a reaching distance of the working air flow blown from the air discharge hole.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
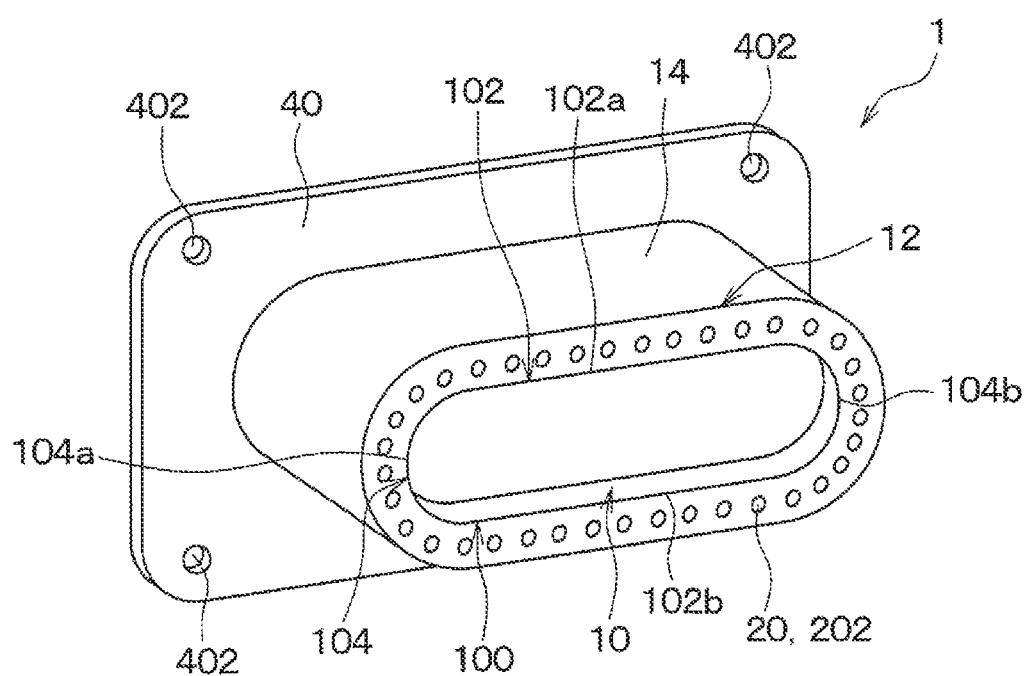
FIG. 1 is a schematic perspective view of an air discharge device according to a first embodiment.

The inventors of the present disclosure have deeply studied an air suction action of an air discharge device when a working air flow is blown out from an air outlet, in order to further increase a reaching distance of the working air flow. As a result, it was found that the air suction action is caused by a lateral vortex generated by a shear force due to a velocity gradient of the working air flow when the working air flow is blown from the air outlet. The lateral vortex is a vortex having the center of the vortex perpendicular to the flow direction of the working air flow. Hereinafter, the center of the vortex is also called a vortex axis.

Further studies by the inventors of the present disclosure have known that, in the vicinity on a downstream side of the air outlet, innumerable lateral vortices generated in the velocity boundary layer are combined and developed into a large-scale vortex, thereby making the air suction action stronger.

However, only the auxiliary air outlet is simply provided around the air outlet, it may be difficult to expect a further improvement in the reaching distance of the air flow.

When the air flow is blown out from the air discharge hole, a lateral vortex is generated downstream of the air discharge hole by the working air flow. Further, in the air discharge device, when the air flow is discharged from the air discharge hole, an auxiliary vortex is also generated by the vortex generation structure. If the lateral vortex and the auxiliary vortex have different vortex characteristics, a development of the lateral vortex can be suppressed when the lateral vortex and the auxiliary vortex collide with each other. In this case, the suction action of the air drawn into the working air flow can be suppressed, and the attenuation of the flow velocity of the working air flow can be reduced. Therefore, it is possible to further increase a reaching distance of the working air flow blown from the air discharge hole.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The following embodiments may be partially combined with each other even if such a combination is not explicitly described as long as there is no disadvantage with respect to such a combination.

First Embodiment

The present embodiment will be described with reference to FIGS. 1 to 7. An air discharge device 1 of the present embodiment is used for an air outlet of an air conditioning unit that air-conditions a vehicle interior. The air outlet of the air conditioning unit is provided inside an instrument panel or at the instrument panel.

Figure 2:
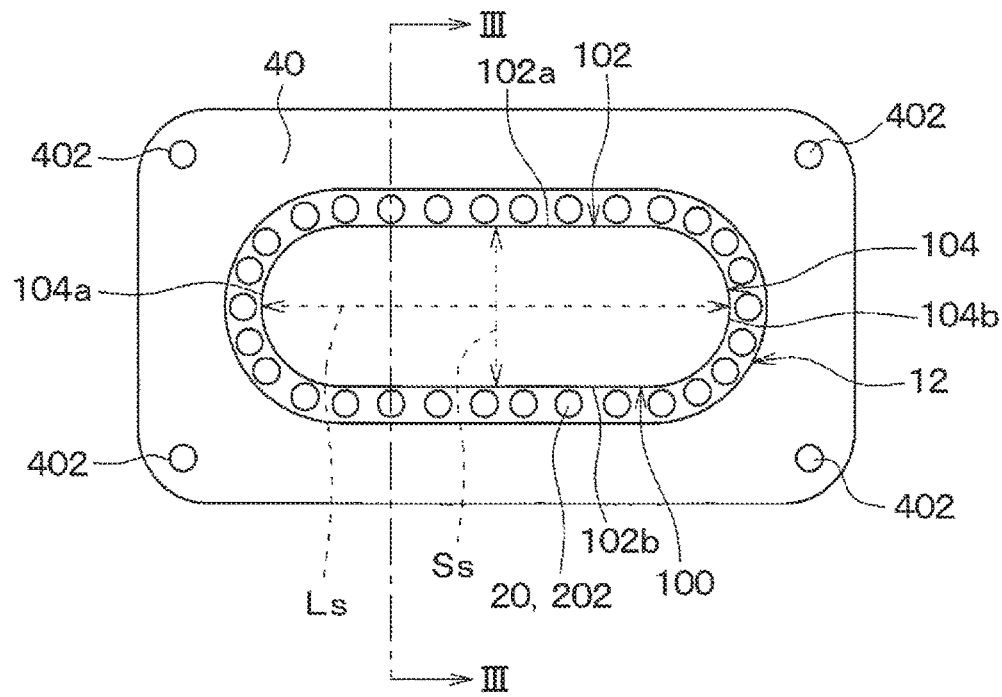
FIG. 2 is a schematic front view of the air discharge device according to the first embodiment.
Figure 3:
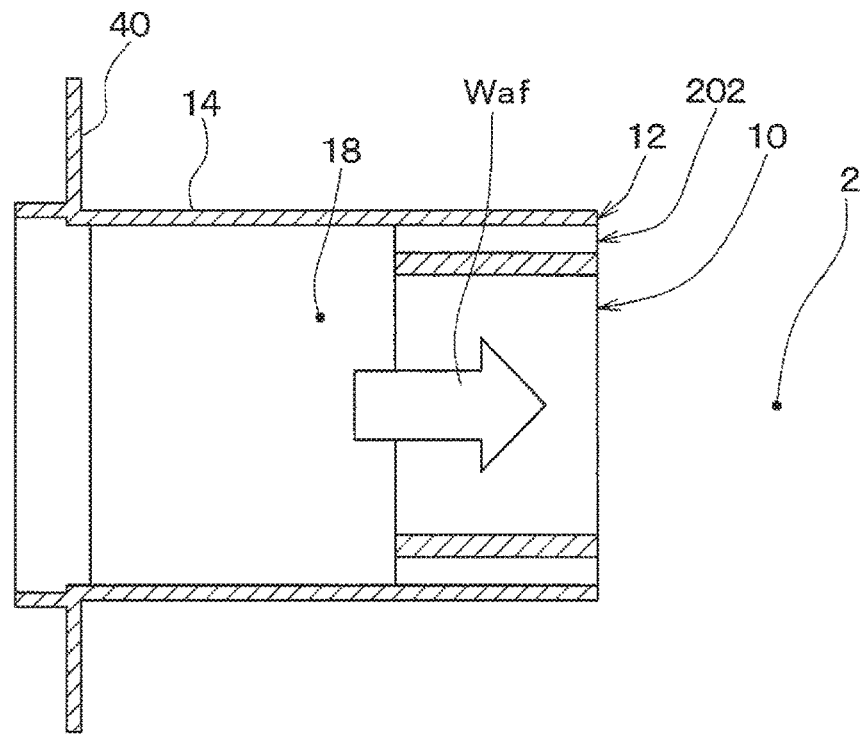
FIG. 3 is a cross-sectional view taken along III-III line in FIG. 2.

As shown in FIGS. 1 to 3, an air discharge device 1 is configured to include a duct 14 that defines a flow passage 18 through which a working air flow Waf to be discharged toward a discharge target 2 passes, and a hole forming member 12 defining an air discharge hole 10 used as an air outlet of the working air flow Waf, and a flange 40

The duct 14 is a cylindrical member. The duct 14 has an upstream portion in an air flow direction, fitted into an air outlet of an air conditioning unit (not shown), and a downstream portion in the air flow direction, connected to an outer periphery of the hole forming member 12. A flow passage 18 is formed inside the duct 14.

The hole forming member 12 is positioned downstream of the duct 14 in the air flow direction. The hole forming member 12 is formed in a tubular shape so that air can be blown out.

An air discharge hole 10 is opened as a single hole at an end of the hole forming member 12. The air discharge hole 10 has an open shape opened toward a discharge target 2 so as to discharge the working air flow Waf toward the discharge target 2.

The open shape of the air discharge hole 10 is a flat shape, for example. Here, the flat shape is a shape in which a pair of long edges 102 facing in the direction of a short axis Ss and a pair of short edges 104 facing in the direction of the long axis Ls are connected with each other. The short axis Ss is perpendicular to the long axis Ls. The air discharge hole 10 is formed such that the length of the short edge 104 is shorter than the length of the long edge 102. The short axis Ss is a center line passing through the center points of the long edges 102 facing to each other, and the long axis Ls is a center line passing through the center points of the short edges 104 facing to each other.

The flat shape is, for example, an elliptical shape formed by combining arcs and straight lines, or an elliptical shape formed by connecting curved lines having large curvature radius and a small curvature radius, or a polygonal shape such as hexagons formed by connecting straight lines or a rectangular shape with rounded corners. Further, the shape of the long edge 102 and the short edge 104 is not limited to a straight line or an arc, and may have an uneven surface with concavity and convexity.

As shown in FIG. 2, a pair of long edges 102 each of which linearly extends in the direction parallel to the long axis Ls and a pair of short edges 104 each of which extends in an arc shape in the direction parallel to the short axis Ss are connected so as to form the open shape of the air discharge hole 10. The short edge 104 is a substantially semicircular arc and has a diameter smaller than the length of the long edge 102.

More specifically, a peripheral edge portion 100 surrounding the air discharge hole 10 is configured by a first edge 102a and a second edge 102b that face each other at a predetermined interval, and third and fourth edges 104a, 104b each connects two ends of the first edge 102a and the second edge 102b. The third edge 104a connects one ends of the first edge 102a and the second edge 102b. The fourth edge 104b connects the other ends of the first edge 102a and the second edge 102b.

The first edge 102a and the second edge 102b extend linearly with a predetermined distance therebetween. Each of the first edge 102a and the second edge 102b has a length along the edge, longer than that of the third edge 104a or the fourth edge 104b, and the distance between the first edge 102a and the second edge 102b is smaller than the distance between the third edge 104a and the fourth edge 104b. The first edge 102a and the second edge 102b form the pair of long edges 102 described above.

Further, each of the third edge 104a and the fourth edge 104b is curved in an arc shape. Each of the third edge 104a and the fourth edge 104b has a length along the edge, shorter than that of the first edge 102a or the second edge 102b, and the distance between the third edge 104a and the fourth edge 104b is larger than the distance between the first edge 102a and the second edge 102b. The third edge 104a and the fourth edge 104b form the pair of short edges 104 described above.

In the hole forming member 12, a plurality of auxiliary holes 202 are formed as a vortex generation structure 20. Specifically, the plurality of auxiliary holes 202 are formed along the pair of long edges 102 and the pair of short edges 104 so as to be arranged side by side at regular intervals over the entire peripheral edge portion 100 of the air discharge hole 10.

The open areas of the auxiliary holes 202 are smaller than the open area of the air discharge hole 10. Further, the auxiliary hole 202 has a circular shape. As shown in FIG. 3, the auxiliary hole 202 is formed to penetrate through the inside of the hole forming member 12 along an extending direction of the flow passage 18. An upstream end of the hole forming member 12 in an air flow direction may be provided to extend to a flange 40. In this case, the auxiliary hole 202 is formed to penetrate through the hole forming member 12 from the outlet to the flange 40.

The flange 40 is provided on an outer periphery of the duct 14 so as to project outside from the duct 14. The flange 40 is formed of a rectangular member with rounded four corners. The flange 40 is a member to be attached to an instrument panel (not shown). The flange 40 is attached to the instrument panel by a connecting member such as a screw, in a state where an upstream side portion of the duct 14 is fitted into the air outlet of the air conditioning unit. The flange 40 is provided with through holes 402 through which a connecting member such as a screw is inserted in the vicinity of the four corners.

Each of the hole forming member 12, the duct 14, and the flange 40 that configure the air discharge device 1 is made of resin. The hole forming member 12, the duct 14, and the flange 40 are formed as an integrally molded product that is integrally molded by a molding technique such as an injection molding. In addition, the hole forming member 12, the duct 14, and the flange 40 may be partly configured separately. The air discharge device 1 configured as described above is installed on an instrument panel (not shown) as described above.

Here, the air discharge device 1 is attached to an air conditioning unit inside the instrument panel installed in the frontmost part of the vehicle interior. In this case, conditioned air whose temperature is adjusted by the air conditioning unit is blown out from the air discharge device 1. At this time, the conditioned air may be required not only to be used for air conditioning of an entire passenger compartment but also to discharge directly to a passenger in the passenger compartment. In this case, it is necessary to blow out not only to a seated person on the front row of the driver's seat in the passenger compartment but also to a seated person on the rear row of the rear seat, and therefore the working air flow Waf is required to have a long reach (long reaching distance).

Thus, the inventors of the present disclosure have studied the factors that shorten the reach of the working air flow Waf. In the vicinity of an air downstream area of the air discharge hole 10, a large number of lateral vortices Vt generated in the velocity boundary layer BL are combined and developed into a large-scale vertex, so that the air suction action becomes stronger, which is one of the factors that shorten the reach of the working air flow Waf.

The air suction action is caused by the lateral vortex Vt generated by the shearing force due to the velocity gradient of the working air flow Waf when the working air flow Waf is blown out from the air discharge hole 10. Hereinafter, the air suction action and the lateral vortex Vt generated by the working air flow Waf will be described with reference to FIGS. 4 and 5.

Figure 4:
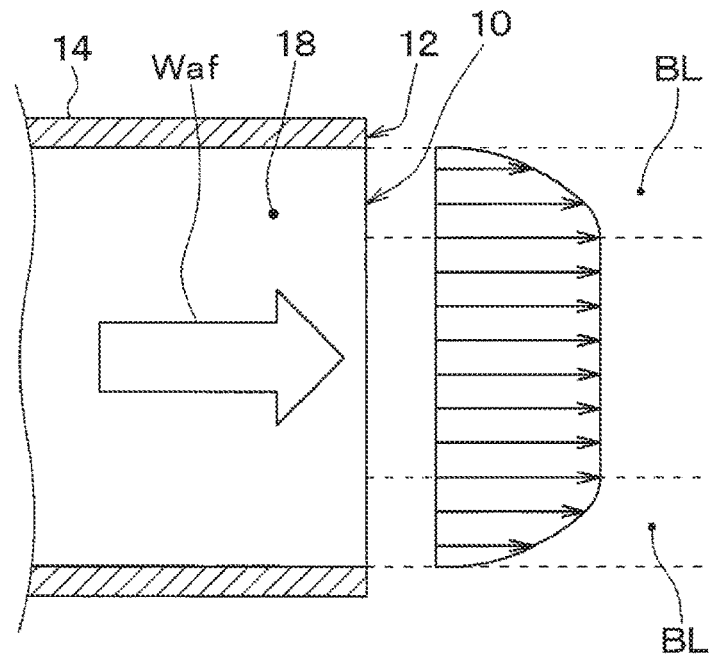
FIG. 4 is a diagram for explaining a velocity gradient of an airflow at a downstream area of a first air outlet, according to a first comparative example.

FIG. 4 is a schematic diagram showing a first outlet that is a first comparative example, with respective to the air discharge device 1 of the present embodiment. The open shape of the air discharge hole 10 of the first outlet as the first comparative example is an elliptical shape formed by combining an arc and a straight line. In addition, in the first comparative example, the one corresponding to the auxiliary hole 202 is not provided in the hole forming member 12 of the first outlet.

As shown in FIG. 4, when the air flow is blown out from the air discharge hole 10 of the duct 14, a difference in speed between the air flow from the air discharge hole 10 and the air that is stationary around the air discharge hole 10 is caused downstream of the outlet of the air discharge hole 10. As a result, the velocity boundary layer BL is formed. The velocity boundary layer BL is a layer that is affected to stationary air, in the air flow blown from the air discharge hole 10.

Figure 5:
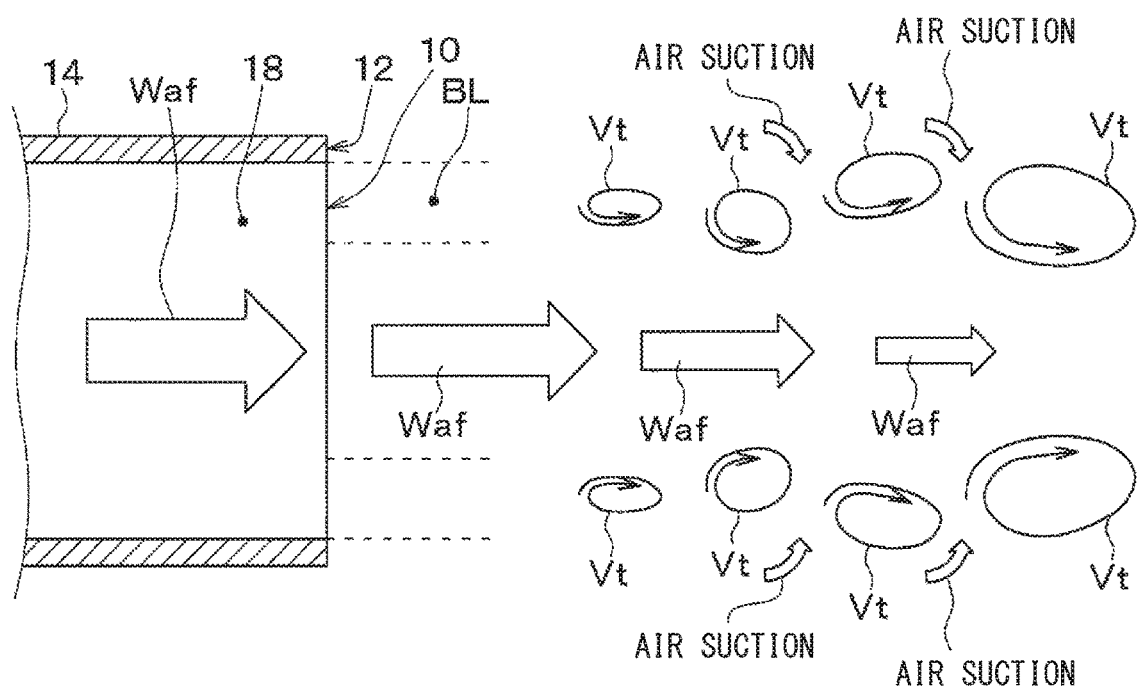
FIG. 5 is a diagram for explaining a state of a lateral vortex and a working air flow at the downstream area of the first air outlet, according to the first comparative example.

In the velocity boundary layer BL, as shown in FIG. 5, an infinite number of lateral vortices Vt are generated by the shearing force due to the velocity gradient. According to the study by the inventors of the present disclosure, it has been found that the synthesis of innumerable lateral vortices Vt generated in the velocity boundary layer BL is made to develop into a large scale, so that the air suction action (entrainment action of air) becomes stronger.

The inventors of the present disclosure studied that, if an auxiliary vortex Vs having a vortex characteristic different from that of the lateral vortex Vt collides with the lateral vortex Vt generated in the velocity boundary layer BL of the working air flow Waf, the development of the lateral vortex Vt can be suppressed and the reach of the working air flow Waf can be lengthened. Thus, the vortex generation structure 20 for generating the auxiliary vortex Vs is formed in the hole forming member 12.

Here, the vortex characteristic indicates a vortex flow state including a vortex rotation direction, a vortex axis direction, a vortex flow velocity, a fluid viscosity, a vortex radius, and the like.

The state of the working air flow Waf downstream of the outlet of the air discharge hole 10 of the air discharge device 1 according to the first embodiment will be described with reference to FIGS. 6 and 7.

In the air discharge device 1 of the present embodiment, when the conditioned air whose temperature has been adjusted by the air conditioning unit flows into the duct 14, the conditioned air flows into the air discharge hole 10 and the auxiliary hole 202 via the flow passage 18.

Figure 6:
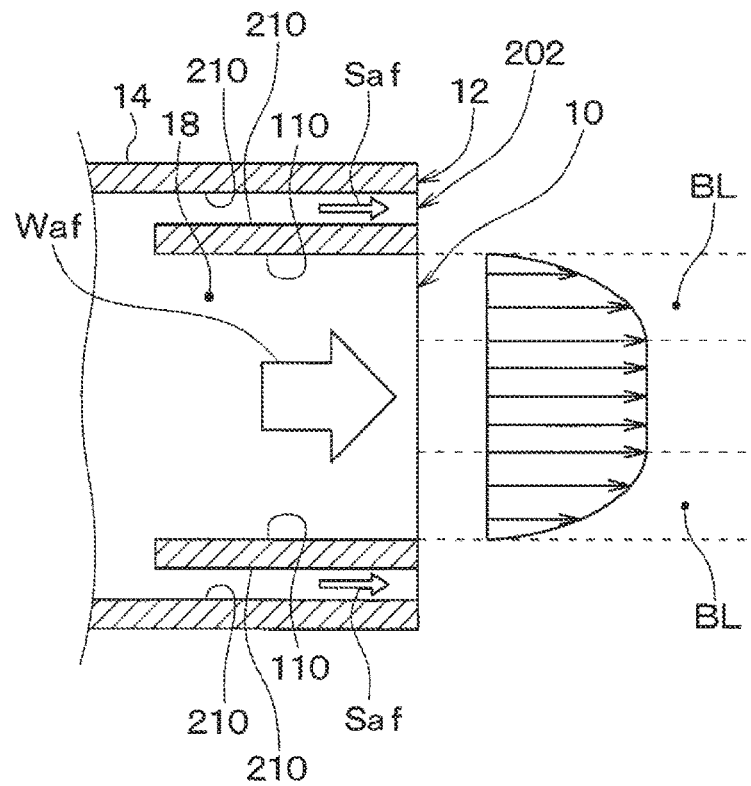
FIG. 6 is a diagram for explaining a velocity gradient of an airflow at a downstream area of an air discharge hole of an air discharge device, according to a first embodiment.

As shown in FIG. 6, when the working air flow Waf is blown out from the air discharge hole 10, a velocity boundary layer BL of the working air flow Waf is formed downstream of the outlet of the air discharge hole 10. The velocity boundary layer BL extends to be continuous from the inner wall surface 110 of the air discharge hole 10 at a downstream side of the outlet of the air discharge hole 10. As a result, innumerable lateral vortices Vt are generated at the downstream side of the outlet of the air discharge hole 10.

Figure 7:
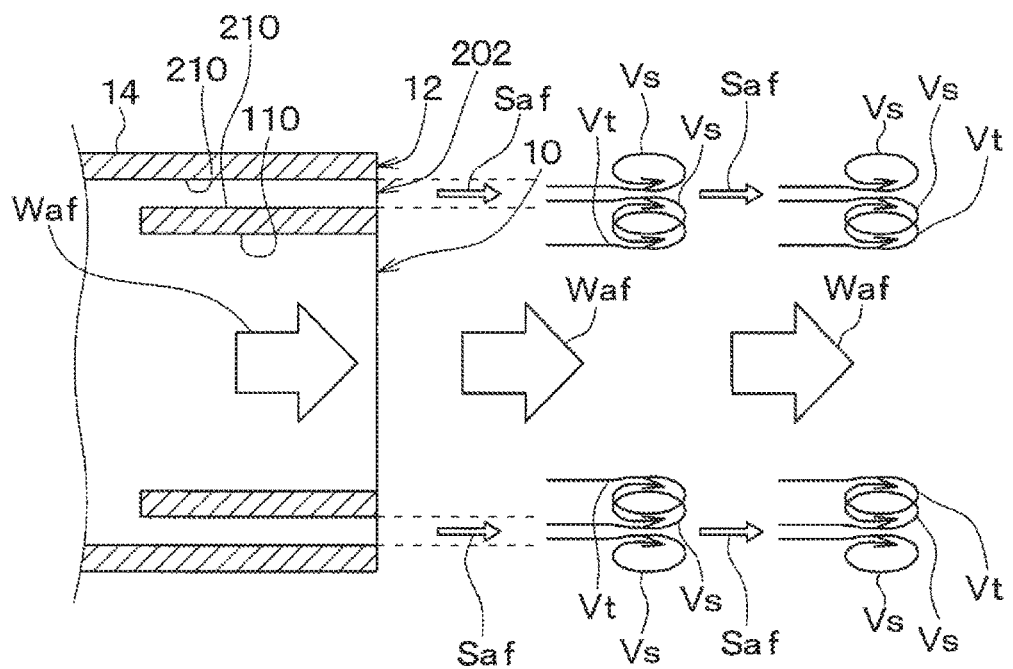
FIG. 7 is a diagram for explaining states of a lateral vortex and an auxiliary vortex of an airflow at a downstream area of the air discharge hole of the air discharge device, according to the first embodiment.

As shown in FIG. 7, the innumerable lateral vortices Vt generated downstream of the outlet of the air discharge hole 10 have a vortex axis intersecting with the flow direction of the working air flow Waf, and a rotation component from the inside of the air discharge hole 10 toward the outside in addition to a straight component in the same direction as the flow direction of the working air flow Waf.

Further, when the auxiliary air flow Saf is blown out from the auxiliary holes 202, the velocity boundary layer BL of the auxiliary air flow Saf is formed on the downstream side of the outlet of the auxiliary holes 202. The velocity boundary layer BL extends to be continuous from the inner wall surface 210 of the auxiliary hole 202 at a downstream side of the outlet of the auxiliary hole 202. As a result, innumerable auxiliary vortices Vs are generated on the downstream side of the outlet of the auxiliary holes 202.

The innumerable lateral vortices Vs generated downstream of the outlet of the auxiliary hole 202 have a vortex axis intersecting with the flow direction of the auxiliary air flow Saf, and a rotation component from the inside of the auxiliary hole 202 toward the outside in addition to a straight component in the same direction as the flow direction of the auxiliary air flow Saf. A part of the auxiliary vortex Vs differs from the lateral vortex Vt in at least the vortex rotation direction of the vortex characteristics. The auxiliary air flow Saf has the same flow direction as the working air flow Waf.

Therefore, downstream of the outlet of the auxiliary hole 202 (that is, downstream of the outlet of the air discharge hole 10), the auxiliary vortex Vs having a rotational direction different from the lateral vortex Vt collides with the lateral vortex Vt. When the lateral vortex Vt and the auxiliary vortex Vs collide with each other, the lateral vortex Vt is greatly disturbed, and thus the lateral vortex Vt is difficult to be synthesized. That is, the development of the lateral vortex Vt generated downstream of the outlet of the air discharge hole 10 is suppressed. As a result, the air suction action in the working air flow Waf is suppressed, so that the working air flow Waf has a longer reach.

In the air discharge device 1 described above, the vortex generation structure 20 is realized by the auxiliary holes 202 formed in the hole forming member 12. Accordingly, the suction action of the air drawn by the working air flow Waf is suppressed, and the attenuation of the flow velocity of the working air flow Waf is reduced. Therefore, it is possible to increase the reach of the working air flow Waf.

Further, when the conditioned air whose temperature is adjusted by the air conditioning unit is blown out from the air discharge hole 10 as the working air flow Waf, the working air flow Waf suppresses the air suction action from the surroundings so that the temperature change of the working air flow Waf can be reduced. That is, according to the air discharge device 1 of the present embodiment, an air stream having an appropriate temperature can reach a desired place, and it is particularly effective for realizing a spot air conditioning in the vehicle interior.

Second Embodiment

Next, a second embodiment will be described with reference to FIGS. 8 to 10. The present embodiment differs from the first embodiment in that the plurality of auxiliary holes 202 are formed to be biased to the edge side of the long edge 102. In the present embodiment, a difference part from the first embodiment will be mainly described, and description for a part similar to the first embodiment will be omitted.

Figure 8:
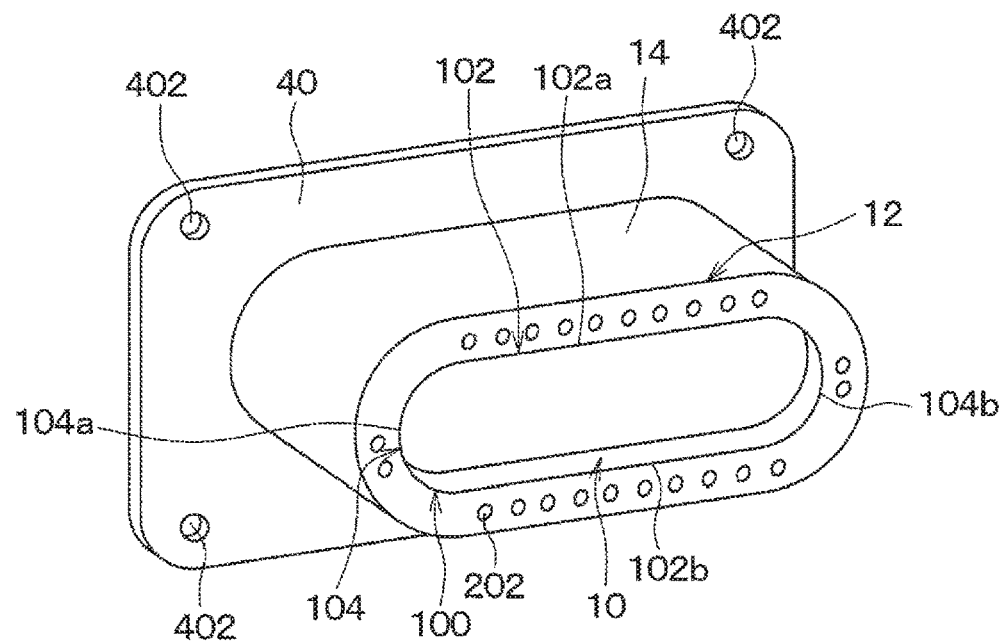
FIG. 8 is a schematic perspective view of an air discharge device according to a second embodiment.
Figure 9:
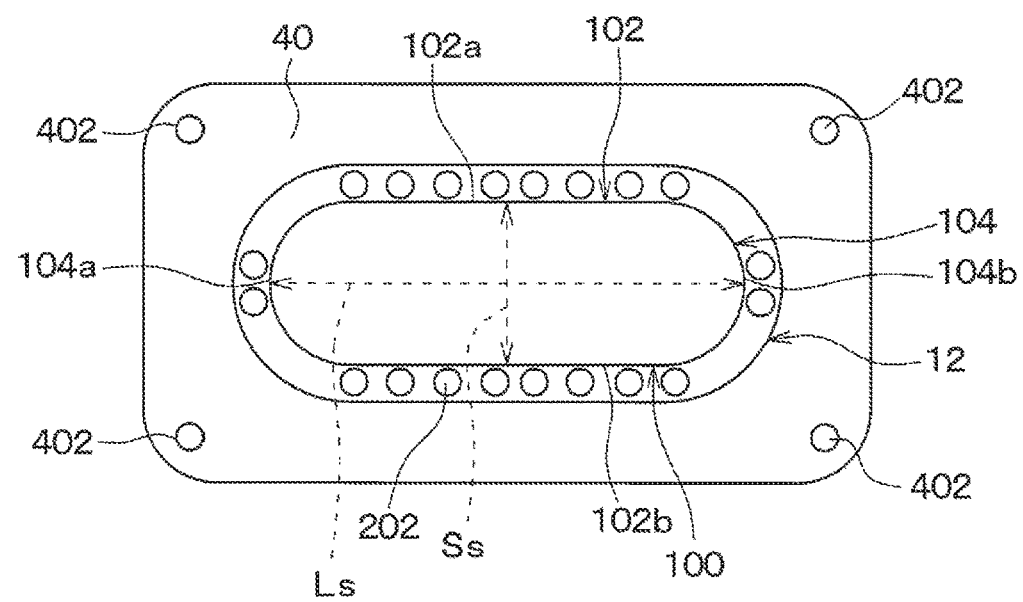
FIG. 9 is a front view of the air discharge device according to the second embodiment.

As shown in FIGS. 8 and 9, a pair of long edges 102 each of which linearly extends in the direction parallel to the long axis Ls and a pair of short edges 104 each of which extends in an arc shape in the direction parallel to the short axis Ss are connected so as to form a flat open shape of an air discharge hole 10.

Further, the number of the plurality of auxiliary holes 202 formed along a peripheral edge portion 100 surrounding the air discharge hole 10 is set such that the number of the auxiliary holes 202 formed along the pair of long edges 102 is larger than the number of the auxiliary holes 202 formed along the pair of short edges 104. That is, an open ratio of the plurality of auxiliary holes 202 in the hole forming member 12 is set such that the open ratio of the plurality of auxiliary holes 202 to a predetermined area of the entire long edges 102 is larger than the open ratio of the plurality of auxiliary holes 202 to a predetermined area of the entire short edges 104.

In a case where the open shape of the air discharge hole 10 is a flat shape, when the working air flow Waf is blown out from the air discharge hole 10, a lateral vortex Vt is generated at a downstream side of the short edge 104 and at a downstream side of the long edge 102. As a result of detail studies by the inventors of the present disclosure, the lateral vortex Vt generated at the downstream side of the short edge 104 is less affected in the reach of the working air flow Waf, as compared with the lateral vortex Vt generated at the downstream side of the long edge 102.

This is because the lateral vortex Vt generated at the downstream side of the short edge 104 is farther from a potential core P of the working air flow Waf, than the lateral vortex Vt generated at the downstream side of the long edge 102. The reaching distance of the working air flow Waf is affected by the lateral vortex Vt generated at the downstream side of the long edge 102, the lateral vortex Vt generated at the downstream side of the short edge 104, and a distance from the potential core P of the working air flow Waf. According to such an idea, the lateral vortex Vt generated at the downstream side of the long edge 102 has a larger effect on the reaching distance of the working air flow Waf, as compared with the lateral vortex Vt generated at the downstream side of the short edge 104.

According to the studies of the inventors of the present disclosure, even if the auxiliary holes 202 are formed mainly on the edge side of the long edge 102, a reaching distance of the working air flow Waf is obtained approximately similar to a case where the auxiliary holes 202 are formed along the entire peripheral edge portion 100 of the air discharge hole 10.

The potential core P will be described below with reference to FIG. 10. FIG. 10 is a diagram for explaining the potential core P of the working air flow at a downstream area of a second air outlet according to a second comparative example. The open shape of the air discharge hole 10 of the outlet as the second comparative example is an elliptical shape formed by combining an arc and a straight line. The auxiliary hole 202 is not formed in a peripheral edge portion 100 of an air discharge hole 10 of the second outlet.

Figure 10:
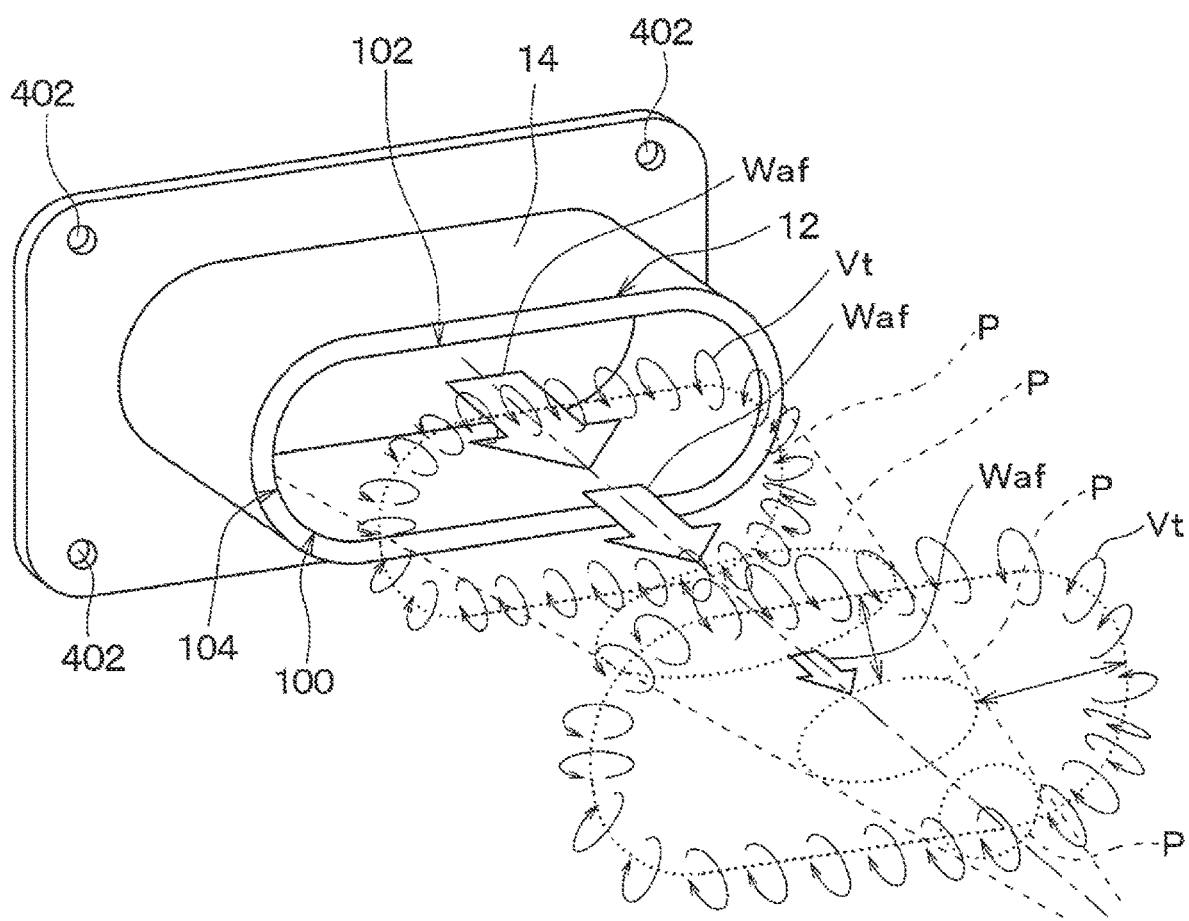
FIG. 10 is a diagram for explaining a potential core of a working air flow at a downstream area of a second air outlet, according to a second comparative example.

As shown in FIG. 10, when the working air flow Waf is blown out from the air discharge hole 10, innumerable lateral vortices Vt are generated downstream of the outlet of the air discharge hole 10 along the peripheral edge portion 100 of the air discharge hole 10. As the distance from the air discharge hole 10 becomes farther, innumerable lateral vortices Vt are synthesized and developed, and the air suction action becomes stronger. As a result, the flow velocity of the working air flow Waf decreases.

Here, a potential core P, in which a turbulence of the air flow is small and the air flow velocity and the air flow pressure are stable, is formed at a center area on a downstream side of the air discharge hole 10. The potential core P is a region that is not easily affected by the surrounding air. Therefore, the working air flow Waf has a flow speed that is hardly reduced in the potential core P, and has the longest reaching distance in the potential core P.

Here, the cross-sectional area of the potential core P in a direction perpendicular to the flow direction of the working air flow Waf becomes smaller as the potential core P goes away from the air discharge hole 10. When the open shape of the air discharge hole 10 is flat, the cross-sectional area of the potential core P converges from a flat shape to a circular shape toward the center of the flat shape as toward the downstream of the working air flow Waf.

On the other hand, since the plurality of lateral vortices Vt generated downstream of the outlet of the air discharge hole 10 are formed along the inner wall surface 110 of the air discharge hole 10, the plurality of lateral vortexes Vt having a flat shape similar to the shape of the air discharge hole 10 is caused and expanded as toward the downstream of the working air flow Waf. Therefore, the lateral vortex Vt generated downstream of the outlet of the short edge 104 is formed at a position farther from the potential core P than the lateral vortex Vt generated downstream of the outlet of the long edge 102.

The inventors of the present disclosure studied that, if an auxiliary vortex Vs having a vortex characteristic different from that of the lateral vortex Vt collides with the lateral vortex Vt generated at the downstream side of the long edge 102, the reach of the working air flow Waf can be lengthened. Therefore, the plurality of auxiliary holes 202 are formed in a biased manner mainly on the edge side of the long edge 102.

In the present embodiment, since the open shape of the air discharge hole 10 is flat, the lateral vortex Vt generated downstream of the outlet of the short edge 104 is positioned away from the potential core P of the working air flow Waf, as compared with the lateral vortex Vt generated downstream of the outlet of the long edge 102. The lateral vortex Vt generated at the downstream side of the short edge 104 has a smaller effect on the reaching distance of the working air flow Waf, as compared with the lateral vortex Vt generated at the downstream side of the long edge 102.

The plurality of auxiliary holes 202 are formed in a biased manner on the edge sides of the pair of long edges 102. The auxiliary vortex Vs generated downstream of the outlet of the auxiliary hole 202 collides with the lateral vortex Vt generated downstream of the outlet of the pair of long edges 102 in a state in which the vortex rotation directions are different. When the lateral vortex Vt, which has a great influence on the reaching distance of the working air flow Waf, collides with the auxiliary vortex Vs, the lateral vortex Vt is greatly disturbed, so that the synthesis of the lateral vortex Vt is less likely to occur. As a result, the air suction action in the working air flow Waf is suppressed, so that the working air flow Waf has a longer reach.

Here, when the lateral vortex Vt collides with the auxiliary vortex Vs, the collision of the lateral vortex Vt and the auxiliary vortex Vs causes aerodynamic noise. In the present embodiment, the number of the plurality of auxiliary holes 202 is smaller on the edge sides of the pair of short edges 104 as compared with that in the first embodiment. Therefore, the collision of the lateral vortex Vt and the auxiliary vortex Vs can be suppressed as compared with a case in which the auxiliary holes 202 are formed along the entire peripheral edge portion 100 of the air discharge hole 10. As a result, it is possible to reduce the aerodynamic noise generated by the collision of the lateral vortex Vt and the auxiliary vortex Vs while suitably increasing the reaching distance of the working air flow Waf.

(Modification to the Second Embodiment)

In the above-described second embodiment, an example in which the auxiliary holes 202 having the same shape and size are formed mainly on the edge side of the long edge 102 has been described, but the present disclosure is not limited to this. For example, the shape and size of the auxiliary hole 202 formed at the short edge 104 may be different from the shape and size of the auxiliary hole 202 formed at the long edge 102 such that the auxiliary vortex Vs is easily generated on the edge side of the pair of long edges 102 as compared with the edge side of the pair of short edges 104. Specifically, one of the auxiliary holes 202 formed at the short edge 104 may be larger and the other thereof may be smaller than the auxiliary hole 202 formed at the long edge 102. Alternatively, the one of the auxiliary holes 202 may be formed in a circular shape and the other of the auxiliary holes 202 may be formed in a polygonal shape.

The vortex characteristics of the lateral vortex Vt generated downstream of the outlet of the auxiliary hole 202 differ depending on the shape and size of the auxiliary hole 202. Therefore, it is desirable that the shape and size of the auxiliary hole 202 are appropriately set according to the intended use of the air discharge device 1.

Third Embodiment

Next, a third embodiment will be described with reference to FIGS. 11 to 16. The present embodiment is different from the second embodiment in that a plurality of auxiliary holes 202 are formed on the edge sides of the long edges 102 and are not formed on the edge sides of the pair of short edges 104. In the present embodiment, a difference part from the second embodiment will be mainly described, and description for a part similar to the second embodiment will be omitted.

Figure 11:
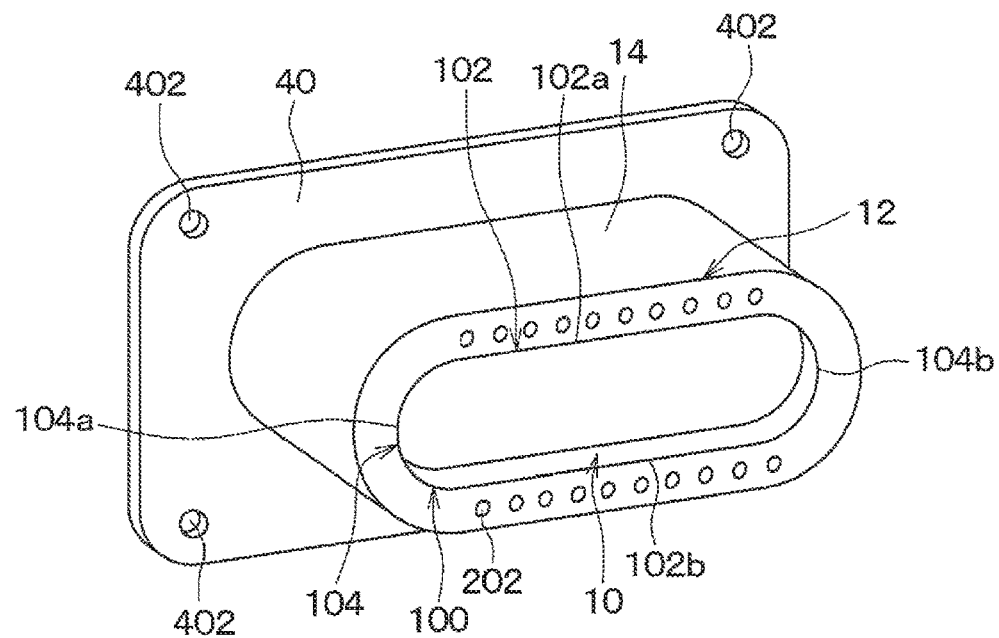
FIG. 11 is a schematic perspective view of an air discharge device according to a third embodiment.
Figure 12:
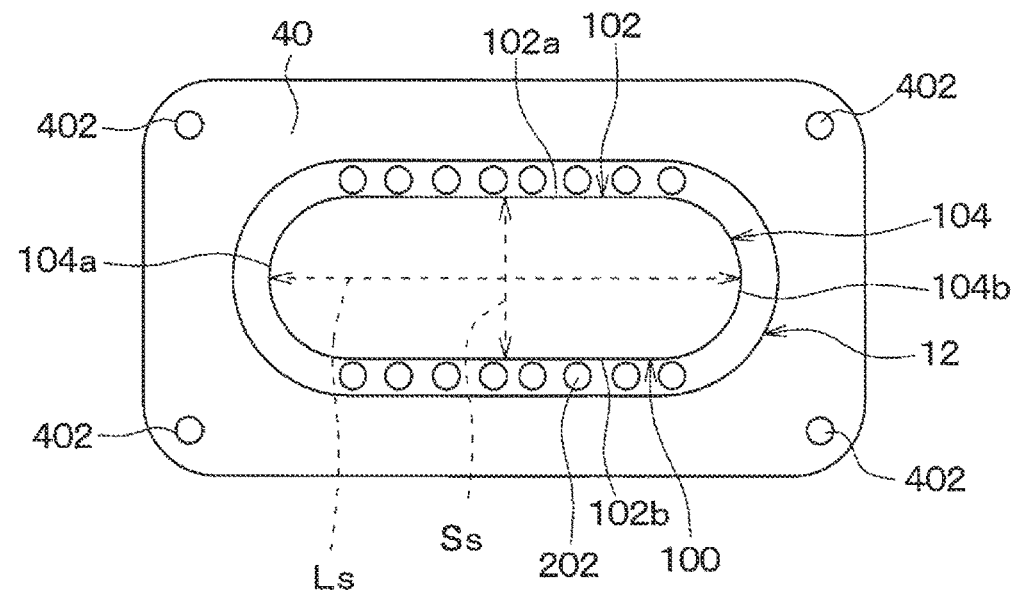
FIG. 12 is a schematic front view of the air discharge device according to the third embodiment.

Specifically, as shown in FIGS. 11 and 12, the edge sides of the pair of short edges 104 are not provided with the auxiliary holes 202, but the auxiliary holes 202 are formed only along the edge sides of the pair of long edges 102.

In the present embodiment, the auxiliary vortex Vs generated along the pair of long edges 102 is caused to collide with the lateral vortex Vt generated downstream of the outlet of the long edge 102, so that development of the auxiliary vortex Vs generated downstream of the outlet of the long edge 102 can be suppressed.

Figure 13:
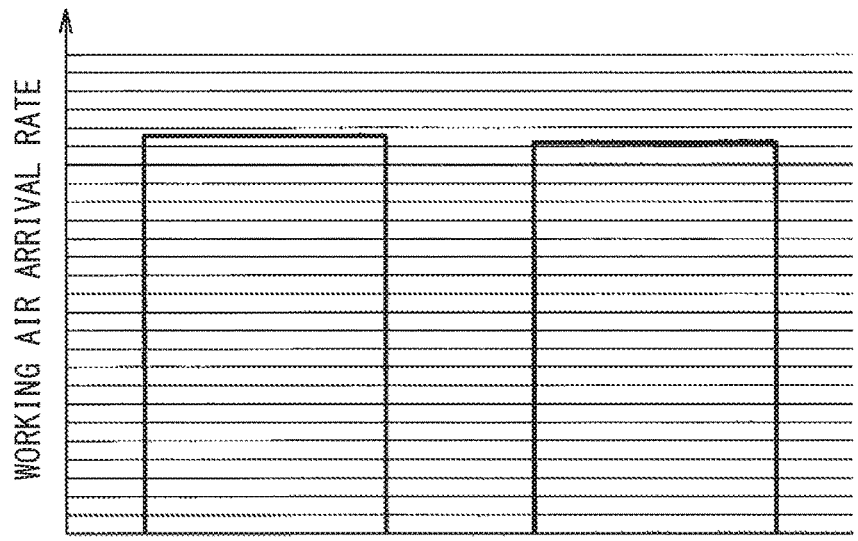
FIG. 13 is a diagram for comparing an influence on a working air arrival rate in cases with and without auxiliary holes on a short edge of a hole forming member, in the air discharge device according to the third embodiment.

FIG. 13 shows an arrival rate (reaching rate) of the working air flow Waf, in a case where the auxiliary holes 202 are formed along the edge sides of the pair of short edges 104 and in a case where the auxiliary holes 202 are not formed along the edge sides of the pair of short edges 104. The left graph of FIG. 13 shows the arrival rate of the working air flow Waf when the auxiliary hole 202 is formed, and the right graph of FIG. 13 shows the arrival rate of the working air flow Waf when the auxiliary hole 202 is not formed. As shown in FIG. 13, in both cases where the auxiliary holes 202 are formed and are not formed along the edge sides of the pair of short edges 104, the arrival rate of the working air flow Waf is about the same.

Figure 14:
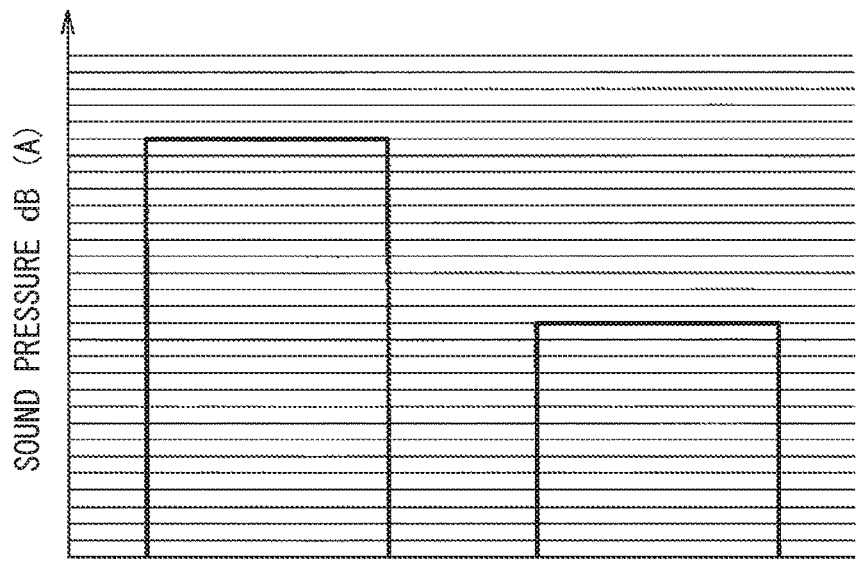
FIG. 14 is a diagram for comparing a sound noise reduction effect of an air pressure in cases with and without the auxiliary holes on the short edge of the hole forming member, in the air discharge device according to the third embodiment.
Figure 15:
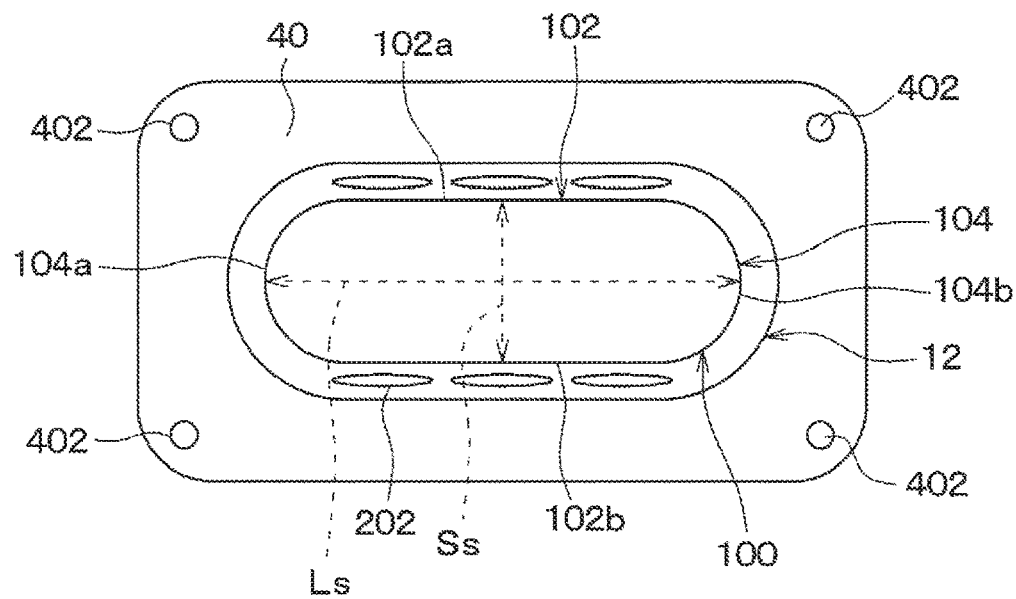
FIG. 15 is a schematic front view of an air discharge device according to a first modification of the third embodiment.

FIG. 14 shows aerodynamic noise generated by collision of the lateral vortex Vt and the auxiliary vortex Vs with and without the auxiliary holes 202 formed along the edge sides of the pair of short edges 104. The left graph of FIG. 14 shows aerodynamic noise when the auxiliary hole 202 is formed, and the right graph of FIG. 14 shows aerodynamic noise when the auxiliary hole 202 is not formed. As shown in FIG. 14, when the auxiliary holes 202 are not formed along the edge sides of the pair of short edges 104, the aerodynamic noise can be reduced as compared with the case where the auxiliary holes 202 are formed.

Generally, the instrument panel is required to be miniaturized from the viewpoint of the design and the expansion of the vehicle interior space. In addition, in the instrument panel, a large-sized information device for displaying the vehicle state and the like tends to be installed in a central portion in the vehicle width direction or/and a portion facing the occupant in the vehicle front-rear direction. Therefore, it is necessary to take measures such as reducing the width of the air discharge hole 10.

According to this embodiment, the auxiliary hole 202 is not formed along the edge sides of the pair of short edges 104. Therefore, in the hole forming member 12, the pair of short edges 104 do not require a forming portion for forming the auxiliary hole 202. As a result, the hole forming member 12 and the duct 14 can be formed smaller than those in the first and second embodiments, and thereby improving the installation flexibility and the mounting flexibility of the air discharge device 1.

(Modification of the Third Embodiment)

In the above-described third embodiment, an example in which the auxiliary hole 202 is formed in a circular shape has been described, but the shape is not limited to this. For example, as shown in the first modification of FIG. 15, the auxiliary hole 202 may be formed in a slit shape.

Figure 16:
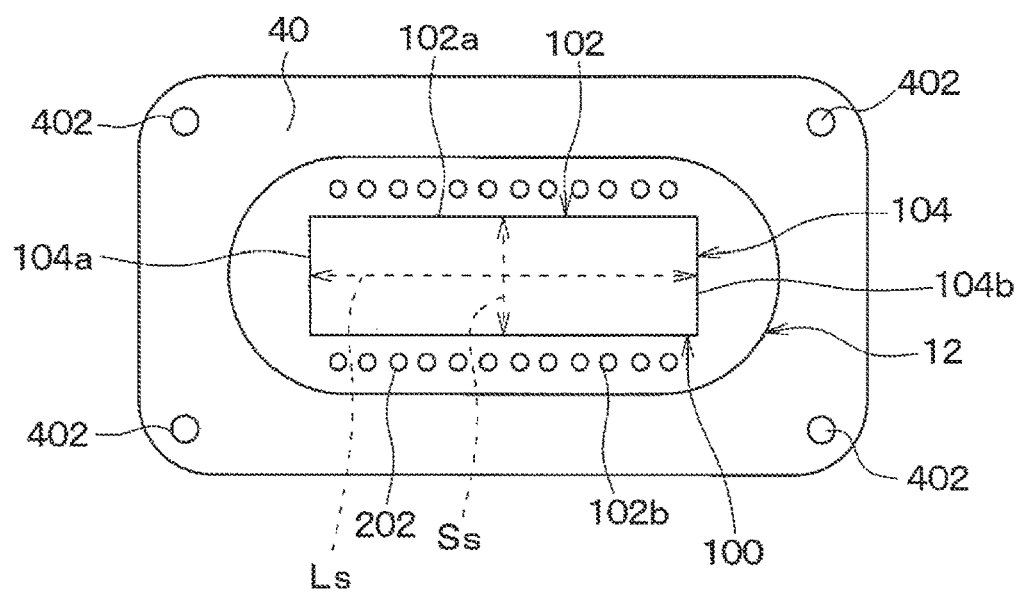
FIG. 16 is a schematic front view of an air discharge device according to a second modification of the third embodiment.

Further, the above-described third embodiment describes regarding an example in which the pair of long edges 102 linearly extending in the direction parallel to the long axis Ls and the pair of short edges extending in an arc shape in the direction parallel to the short axis Ss are connected to form the open shape of the air discharge hole 10; however, the present disclosure is not limited to this. For example, as shown in FIG. 16, a pair of long edges 102 each of which linearly extends in the direction parallel to the long axis Ls and a pair of short edges 104 each of which linearly extends in the direction parallel to the short axis Ss may be connected so as to form a rectangular open shape of an air discharge hole 10.

Fourth Embodiment

Next, a fourth embodiment will be described with reference to FIGS. 17 to 22. As compared with the first embodiment, the present embodiment has different points of a vortex generation structure 20, in which concave portions 206 and the convex portions 208 are alternately arranged along a peripheral edge portion 100 of a hole forming member 12, defining an air discharge hole 10. In the present embodiment, a difference part different from the first embodiment will be mainly described, and description for a part similar to the first embodiment will be omitted.

Figure 17:
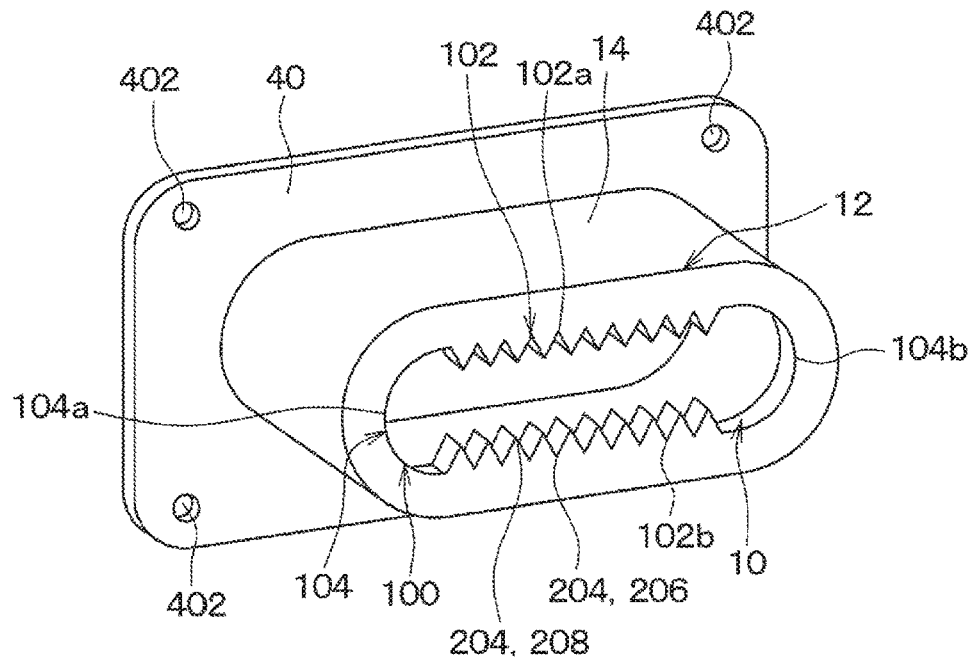
FIG. 17 is a schematic perspective view of an air discharge device according to a fourth embodiment.
Figure 18:
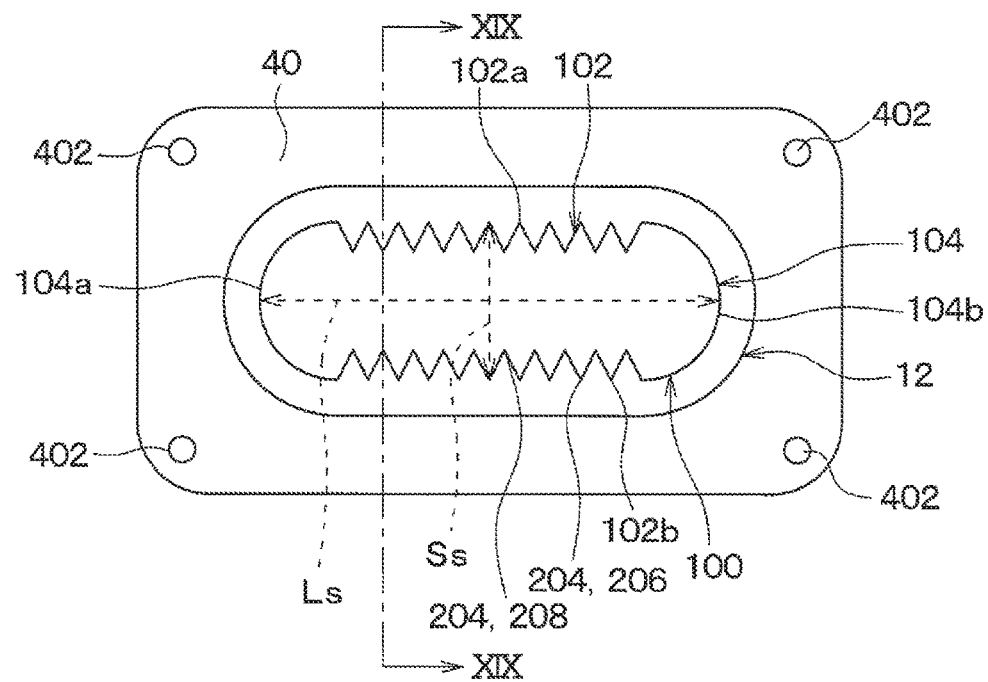
FIG. 18 is a schematic front view of the air discharge device according to the fourth embodiment.

As shown in FIGS. 17 and 18, the vortex generation structure 20 includes a plurality of uneven portions 204 in which the concave portions 206 and the convex portions 208 are alternately arranged along the peripheral edge portion 100 of the hole forming member 12, defining the air discharge hole 10. Further, the open shape of the air discharge hole 10 is formed by connecting a pair of sawtooth-shaped long edges 102 extending in the direction parallel to the long axis Ls and a pair of short edges 104 extending in an arc shape with respect to the direction parallel to the short axis Ls. Here, the sawtooth shape is a shape in which the bases of a plurality of triangles are continuously connected to each other.

Specifically, the triangle is a substantially isosceles triangle having one base and two equilateral sides, and the base is arranged along the long edge 102 without a gap. Further, the vertices of the substantially isosceles triangle are formed so as to project toward the vertices of the substantially isosceles triangle of the facing long edges 102 in the pair of long edges 102. The area of each substantially isosceles triangle is smaller than the open area of the air discharge hole 10 so as not to interfere with the flow of the working air flow Waf blown out from the air discharge hole 10.

Further, the plurality of uneven portions 204 are not formed along the edge sides of the pair of short edges 104, but are formed only along the edge sides of the pair of long edges 102.

However, the plurality of uneven portions 204 may be formed along the short edge 104 in addition to the long edge 102.

Figure 19:
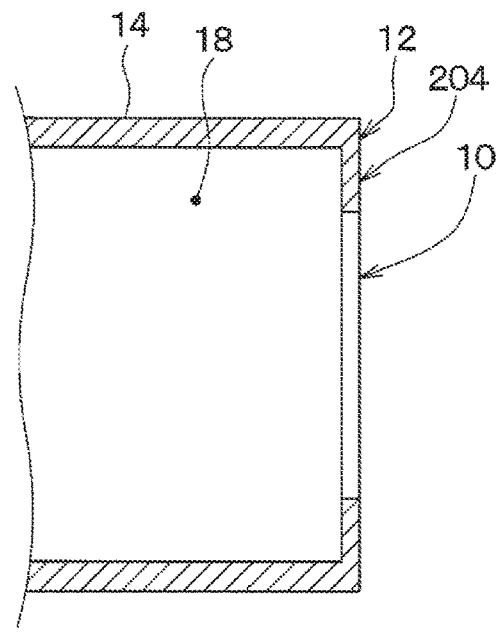
FIG. 19 is a cross-sectional view taken along line XIX-XIX in FIG. 18.

A cross section of the air discharge hole 10 will be described with reference to FIG. 19. As shown in FIG. 19, the plurality of uneven portions 204 are formed in a plate shape having a thickness in the air flow direction. That is, the plurality of uneven portions 204 have a rectangular shape respectively in cross section.

The plate surface on the downstream air side of the plurality of uneven portions 204 is on the same surface as the end surface on the downstream air side of the peripheral edge portion 100 of the hole forming member 12. In other words, in the plurality of uneven portions 204, the plate surface on the downstream side of the air flow is placed on the same surface as the end surface of the hole forming member 12 where the air discharge hole 10 opens.

The states of the working air flow Waf, the lateral vortex Vt, and the auxiliary vortex Vs downstream of the outlet of the air discharge hole 10 of the air discharge device 1 according to the fourth embodiment will be described with reference to FIGS. 20 to 22.

In the air discharge device 1 of the present embodiment, when the conditioned air whose temperature has been adjusted by the air conditioning unit flows into the duct 14, the conditioned air flows into the air discharge hole 10 via the flow passage 18.

Figure 20:
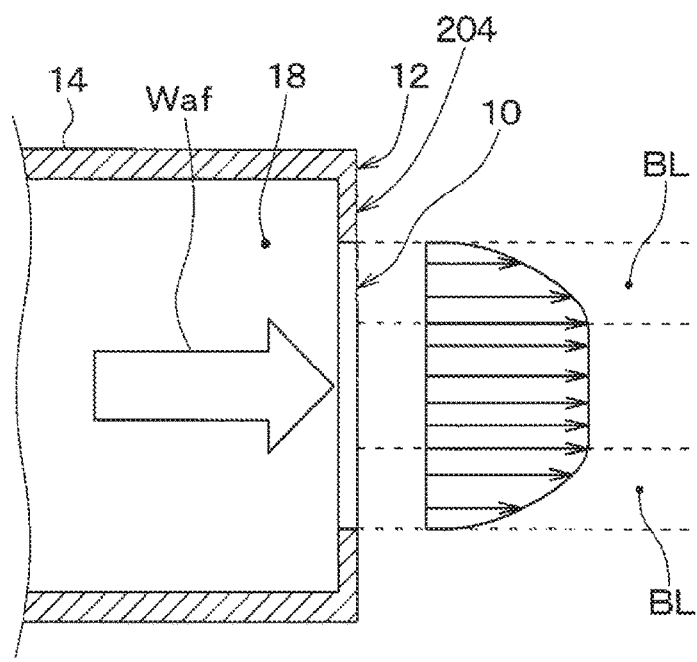
FIG. 20 is a diagram for explaining a velocity gradient of an airflow at a downstream area of an air discharge hole of an air discharge device, according to a fourth embodiment.

As shown in FIG. 20, when the working air flow Waf is blown out from the air discharge hole 10, the velocity boundary layer BL is formed. As a result, innumerable lateral vortices Vt are generated at the downstream side of the outlet of the air discharge hole 10.

Figure 21:
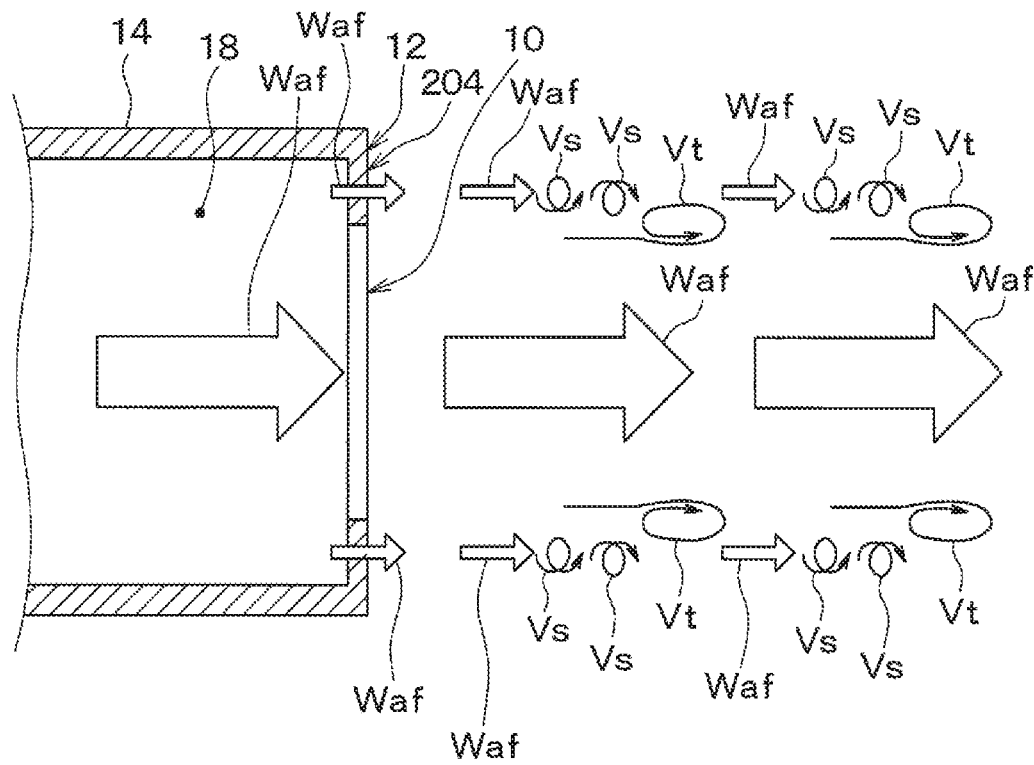
FIG. 21 is a diagram for explaining states of a lateral vortex and an auxiliary vortex of an airflow at a downstream area of the air discharge hole of the air discharge device, according to the fourth embodiment.

As shown in FIG. 21, the innumerable lateral vortices Vt generated downstream of the outlet of the air discharge hole 10 have a vortex axis intersecting with the flow direction of the working air flow Waf, and a rotation component from the inside of the air discharge hole 10 toward the outside in addition to a straight component in the same direction as the flow direction of the working air flow Waf.

Further, when the working air flow Waf is blown out from the gaps between the plurality of substantially isosceles triangular uneven portions 204, innumerable auxiliary vortices Vs are generated on the air flow downstream side of the uneven portions 204.

Figure 22:
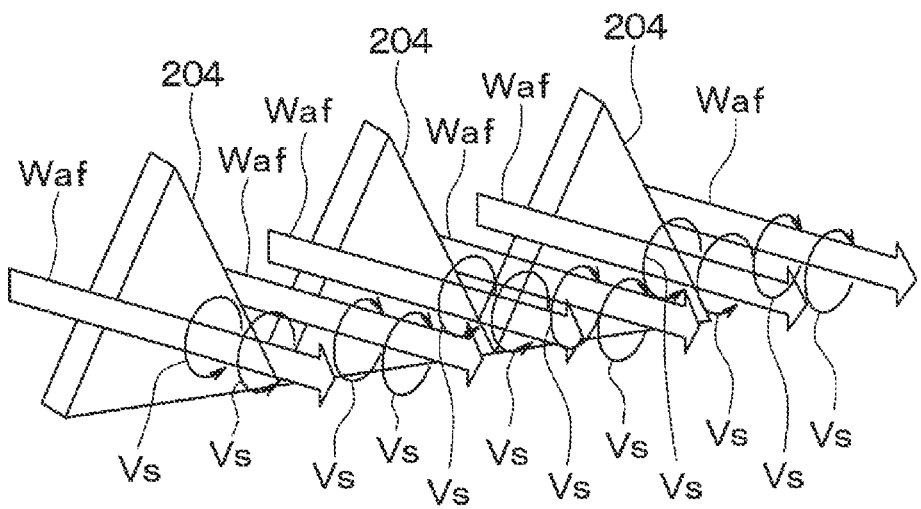
FIG. 22 is a diagram for explaining a state of an auxiliary vortex of an airflow at a downstream area of a vortex generation structure of the air discharge device, according to the fourth embodiment.

As shown in FIG. 22, innumerable auxiliary vortices Vs are generated on the downstream air side of the plurality of uneven portions 204, at the respective equilateral sides of the substantially isosceles triangles. The auxiliary vortex Vs has a vortex axis orthogonal to the equilateral side of the isosceles triangle. Further, the rotation directions of the vortices of the auxiliary vortex Vs generated on the respective equilateral sides of the substantially isosceles triangle are opposite to each other. That is, the innumerable auxiliary vortices Vs differ from the lateral vortex Vt in at least the vortex rotation direction and the vortex axis direction of the vortex characteristics.

Therefore, on the downstream side of the outlet of the air discharge hole 10, which is downstream of the uneven portion 204, the lateral vortex Vt is collided with the auxiliary vortex Vs having rotational direction and vortex axis different from those of the lateral vortex Vt. When the lateral vortex Vt and the auxiliary vortex Vs collide with each other, the lateral vortex Vt is greatly disturbed, and thus the lateral vortex Vt is difficult to be synthesized. That is, the development of the lateral vortex Vt generated downstream of the outlet of the air discharge hole 10 is suppressed. As a result, the air suction action in the working air flow Waf is suppressed, so that the working air flow Waf has a longer reach.

In the present embodiment, the plurality of uneven portions 204 are not formed along the edge sides of the pair of short edges 104, but are formed only along the edge sides of the pair of long edges 102. Therefore, the collision of the lateral vortex Vt and the auxiliary vortex Vs can be suppressed as compared with a case in which the uneven portions 204 are formed along the entire peripheral edge portion 100 of the air discharge hole 10. Thus, it is possible to reduce the aerodynamic noise generated by the collision of the lateral vortex Vt and the auxiliary vortex Vs while suitably increasing the reaching distance of the working air flow Waf.

Further, in the present embodiment, since the plurality of uneven portions 204 are formed only along the edge sides of the pair of long edges 102, the edge sides of the pair of short edges 104 are unnecessary to form the uneven portions 204. Therefore, the hole forming member 12 and the duct 14 can be formed smaller than a case where the plurality of uneven portions 204 are formed along the entire peripheral edge portion 100, and thereby the air discharge device 1 can be installed easily and mounting ability of the air discharge device 1 can be improved.

The plurality of uneven portions 204 are formed in a plate shape having a thickness in the air flow direction. In this case, the auxiliary vortex Vs is more likely generated when the airflow passes between the uneven portions 204, as compared with, for example, a case where the multiple uneven portions 204 are formed to extend to the flange 40. As a result, the air suction action in the working air flow Waf is suppressed, so that the working air flow Waf has a longer reach.

The plate surface on the downstream air side of the plurality of uneven portions 204 is on the same surface as the end surface on the downstream air side of the peripheral edge portion 100 of the hole forming member 12. According to this, the position where the auxiliary vortex Vs is generated by the uneven portion 204 approaches the position where the lateral vortex Vt in the hole forming member 12 starts to occur. Therefore, the auxiliary vortex Vs easily collides with the lateral vortex Vt, and development of the lateral vortex Vt can be sufficiently suppressed.

(Modification of Fourth Embodiment)

Figure 23:
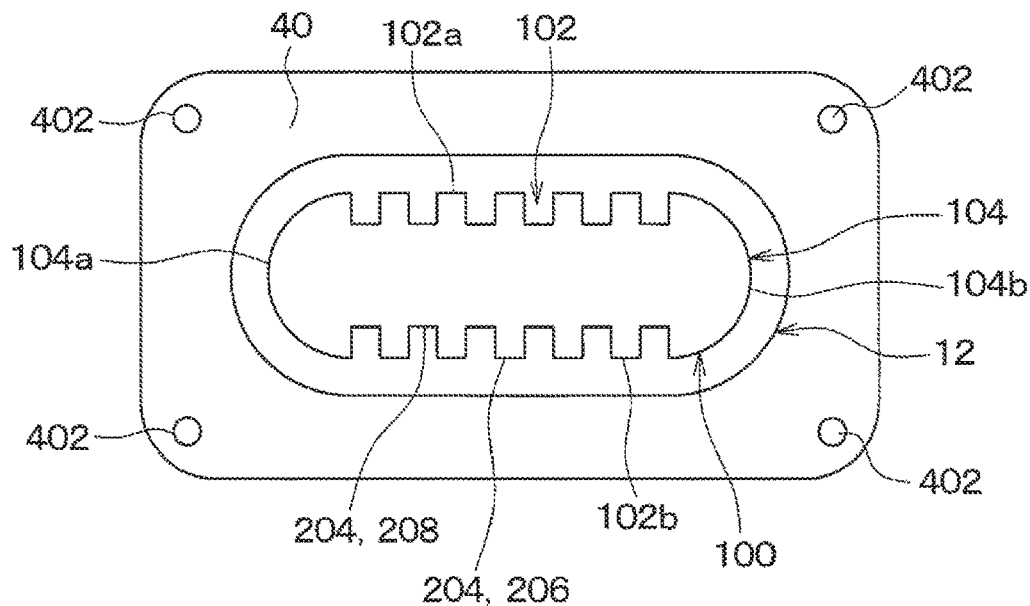
FIG. 23 is a schematic front view of an air discharge device according to a first modification of the fourth embodiment.
Figure 24:
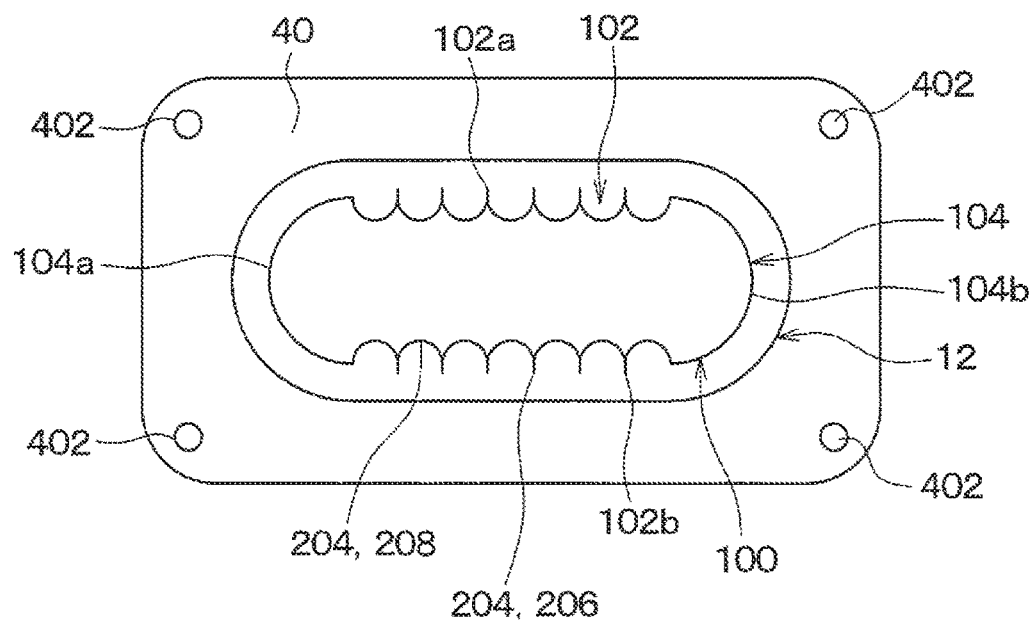
FIG. 24 is a schematic front view of an air discharge device according to a second modification of the fourth embodiment.
Figure 25:
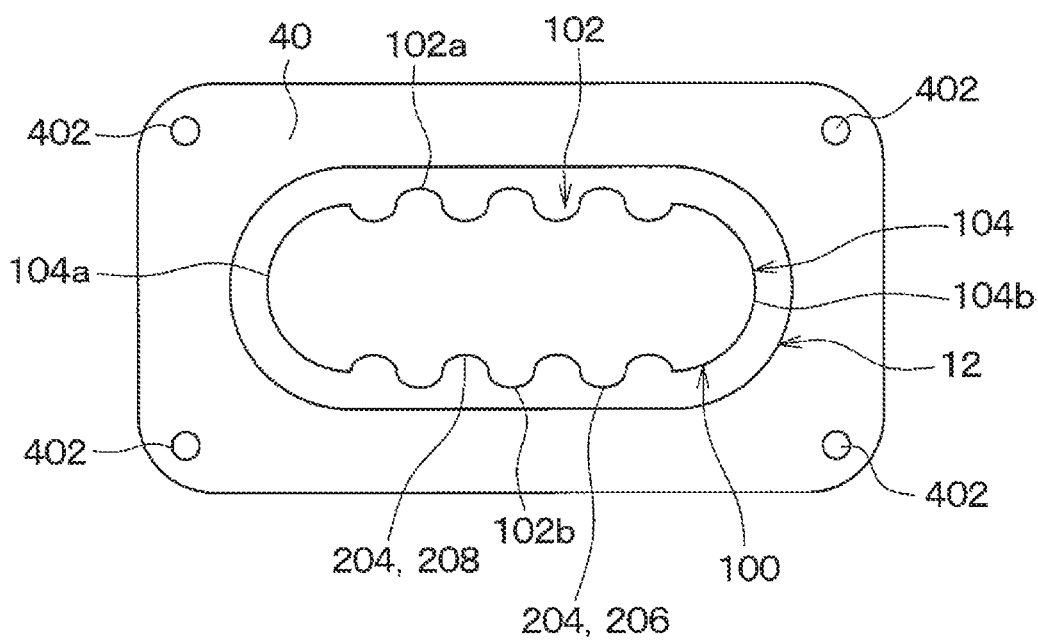
FIG. 25 is a schematic front view of an air discharge device according to a third modification of the fourth embodiment.

In the above-described fourth embodiment, an example in which the plurality of uneven portions 204 are formed in a sawtooth shape having substantially isosceles triangles continuously arranged has been described, but the present disclosure is not limited to this. For example, as shown in a first modification of FIG. 23, the shape of the plurality of uneven portions 204 may be formed in a rectangular shape. Alternatively, as shown in a second modification of FIG. 24, the shape of the plurality of uneven portions 204 may be formed in an arc shape. Alternatively, as shown in a third modification of FIG. 25, the shape of the plurality of uneven portions 204 may be formed in a wave shape. Further, the shape of the plurality of uneven portions 204 may be formed in a substantially equilateral triangle shape or a substantially right triangle shape. In addition, the shapes of the plurality of uneven portions 204 may be formed by combining triangular shapes, rectangular shapes, arc shapes, wave shapes, and the like. Further, the concave portion 206 and the convex portion 208 may be formed side by side with a certain distance.

Figure 26:
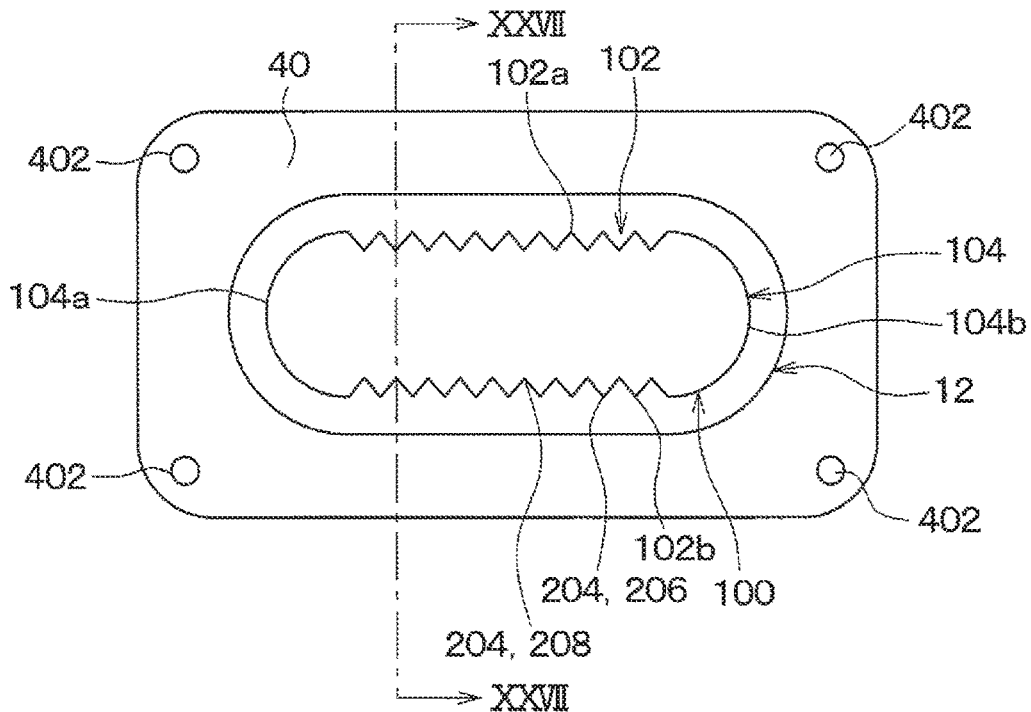
FIG. 26 is a schematic front view of an air discharge device according to a fourth modification of the fourth embodiment.
Figure 27:
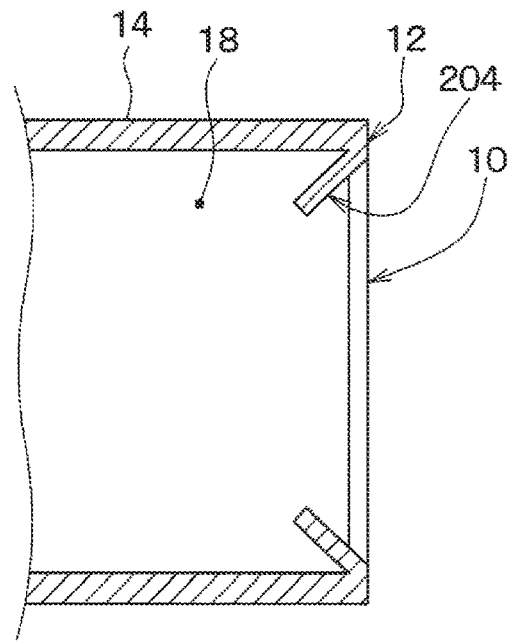
FIG. 27 is a cross-sectional view taken on a line XVII-XXVII in FIG. 26.
Figure 28:
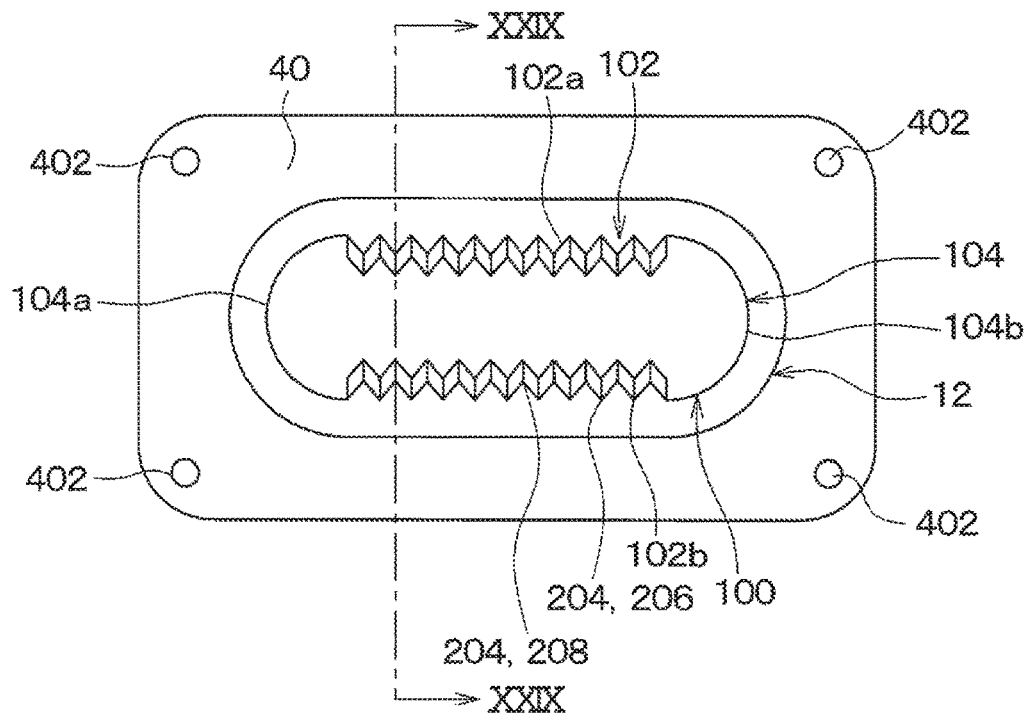
FIG. 28 is a schematic front view of an air discharge device according to a fifth modification of the fourth embodiment.
Figure 29:
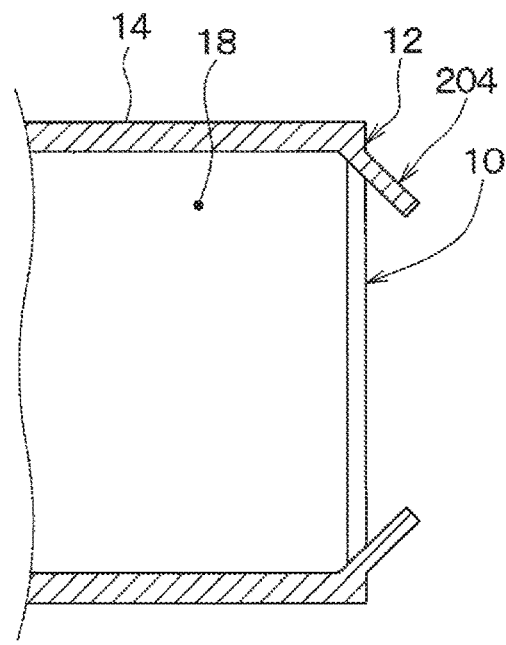
FIG. 29 is a cross-sectional view taken along line XXIX-XXIX in FIG. 28.

Further, the above-described fourth embodiment describes regarding an example in which the vertices of the substantially isosceles triangle of the plurality of uneven portions 204 are formed to project toward the vertices of the approximately isosceles triangle of the facing long edge 102; however, it is not limited to this. For example, as shown in a fourth modification of FIG. 26, the vertices of the substantially isosceles triangle may be formed inside the duct 14 to project toward an upstream direction of the air flow in the duct 14. Specifically, as in the cross section of the fourth modification shown in FIG. 27, the plurality of uneven portions 204 may be formed to be inclined in the air flow upstream direction of the duct 14. Alternatively, as shown in a fifth modification of FIG. 28, the vertices of the substantially isosceles triangle may be formed inside the duct 14 to project toward a downstream direction of the air flow in the duct 14. Specifically, as in the cross section of the fifth modification shown in FIG. 29, the plurality of uneven portions 204 may be formed to be inclined in the air flow downstream direction of the duct 14.

Further, in the above-described fourth embodiment, an example in which the plurality of uneven portions 204 are formed in a plate shape has been described, but the shape is not limited to this. For example, if the shape of the plurality of uneven portions 204 on the open side of the air discharge hole 10 is triangular, the shape of the inner portion of the hole forming member 12 is a triangular pyramid or a triangular prism, and the end of the hole forming member 12 may extend inside of the duct 14 toward the upstream side of the air flow.

Further, the shape of the plurality of uneven portions 204 has been described as an example in which the uneven portions 204 project toward the inside of the air discharge hole 10, but the shape is not limited to this. The plurality of uneven portions 204 may be formed so as to be recessed from the peripheral edge 100 of the air discharge hole 10 toward the outside of the ejection hole 10, or the plurality of uneven portions 204 may be alternately arranged to protrude inside of the air discharge hole 10 and to be recessed to the outside of the air discharge hole 10.

Further, in the above-described fourth embodiment, the vortex generation structure 20 in which the plurality of uneven portions 204 are formed has been described, but the vortex generation structure 20 is not limited to this. The vortex generation structure 20 may include a plurality of auxiliary holes 202 illustrated in the first embodiment, in addition to the plurality of uneven portions 204.

Fifth Embodiment

Next, a fifth embodiment will be described with reference to FIGS. 30 and 31. The present embodiment differs from the first embodiment, in which the vortex generation structure 20 has a structure including a plurality of vortex generators 22. In the present embodiment, a difference part different from the first embodiment will be mainly described, and description for a part similar to the first embodiment will be omitted.

Figure 30:
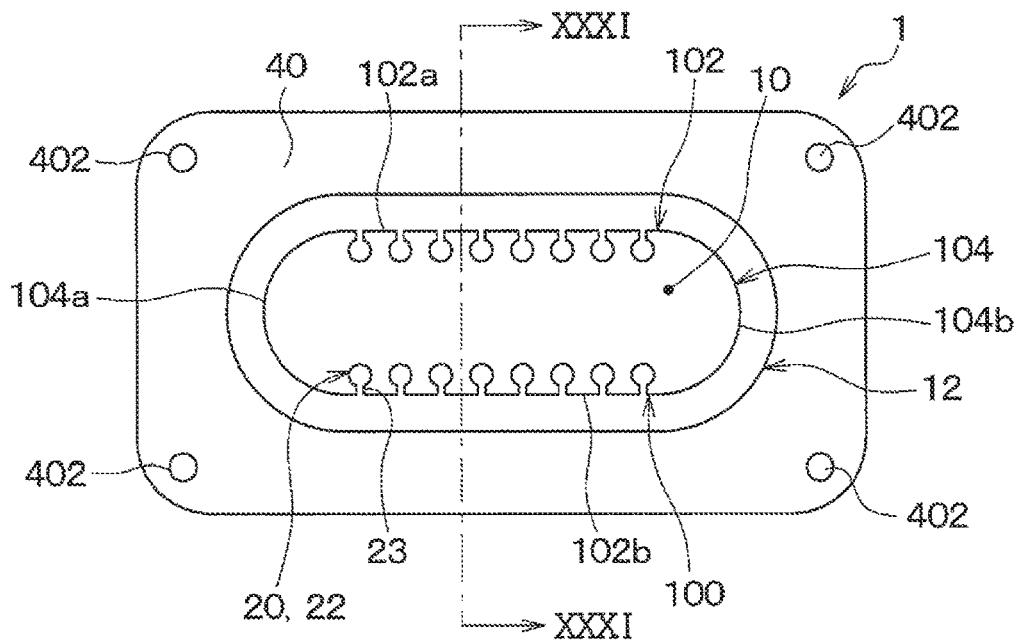
FIG. 30 is a schematic front view of an air discharge device according to a fifth embodiment.

As shown in FIG. 30, the vortex generation structure 20 is formed of a plurality of vortex generators 22 arranged side by side along the peripheral edge portion 100 of the hole forming member 12 defining the air discharge hole 10. In addition, the open shape of the air discharge hole 10 is a flat shape, and is formed by a pair of straight long edges 102 and a pair of arcuate short edges 104 connected with each other.

Each of the plurality of vortex generators 22 is formed of a disk-shaped member having a circular shape when being viewed from the open direction of the air discharge hole 10. The plurality of vortex generators 22 are arranged inside the air discharge hole 10 at equal intervals along the peripheral edge 100 of the air discharge hole 10. The plurality of vortex generators 22 have an area smaller than the open area of the air discharge hole 10 so as not to interfere with the flow of the working air flow Waf blown out from the air discharge hole 10. The plurality of vortex generators 22 are arranged inside the air discharge hole 10 at equal intervals along the peripheral edge portion 100 of the air discharge hole 10.

The plurality of vortex generators 22 are supported inside the air discharge hole 10 by a support portion 23 extending in a predetermined direction perpendicular to the open direction of the air discharge hole 10 so as not to directly contact the peripheral edge portion 100. Specifically, each of the plurality of vortex generators 22 is connected to a tip portion of a rod-shaped support portion 23 that protrudes inward from the peripheral edge portion 100.

Further, the plurality of vortex generators 22 are arranged mainly at the edge sides of the pair of long edges 102, as compared with the edge sides of the pair of short edges 104. Specifically, the plurality of vortex generators 22 are not arranged along the edge sides of the pair of short edges 104, but are only arranged along the edge sides of the pair of long edges 102. However, the plurality of vortex generators 22 may be formed along the short edge 104 in addition to the long edge 102.

Figure 31:
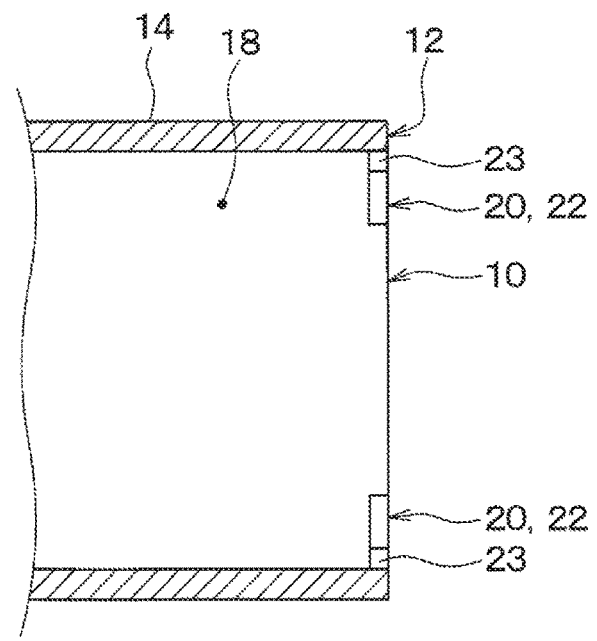
FIG. 31 is a cross-sectional view taken along line XXXI-XXXI in FIG. 30.
Figure 32:
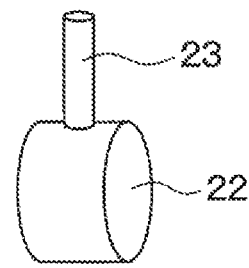
FIG. 32 is a schematic perspective view of a vortex generator according to a fifth embodiment.

As shown in FIG. 31, the plurality of vortex generators 22 are plate-shaped members having a thickness in the open direction of the air discharge hole 10. Specifically, as shown in FIG. 32, each of the vortex generators 22 has a circular shape when viewed from the open direction of the air discharge hole 10, and has a disk-shaped member having a quadrangular shape when being viewed from a direction perpendicular to the open direction of the air discharge hole 10.

The plate surface on the downstream air side of the plurality of vortex generators 22 is on the same surface as the end surface on the downstream air side of the peripheral edge portion 100 of the hole forming member 12. In other words, in the plurality of the vortex generators 22, the plate surface on the downstream side of the air flow is placed on the same surface as the end surface of the hole forming member 12 where the air discharge hole 10 opens.

In the air discharge device 1 with the above structure, when the conditioned air whose temperature has been adjusted by the air conditioning unit flows into the duct 14, the conditioned air flows into the air discharge hole 10 via the flow passage 18. When the working air flow Waf is blown out from the air discharge hole 10, innumerable lateral vortices Vt are generated downstream of the air discharge hole 10.

Figure 33:
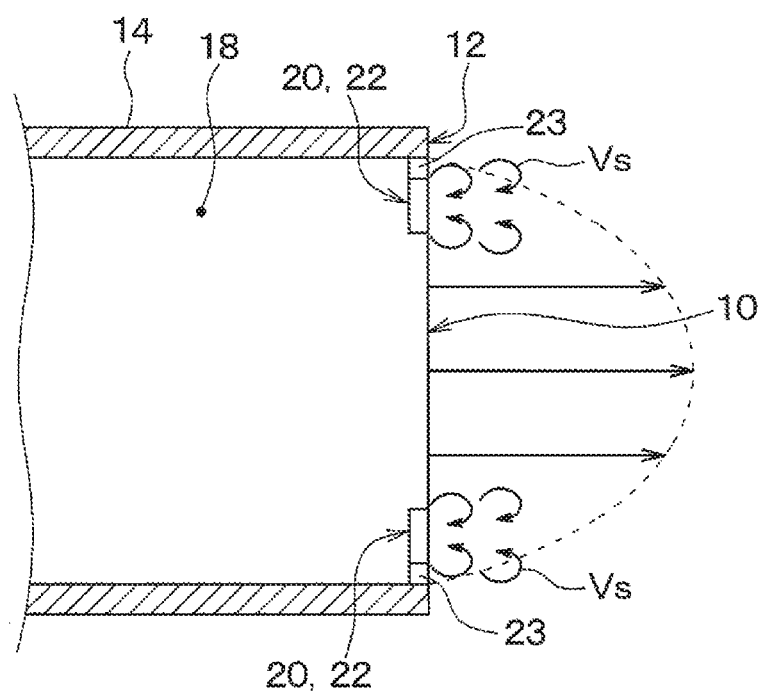
FIG. 33 is a diagram for explaining an auxiliary vortex formed downstream of the vortex generator according to the fifth embodiment.

In the air discharge device 1 of the present embodiment, a plurality of vortex generators 22 are arranged inside the air discharge hole 10. Therefore, a part of the conditioned air flowing through the flow passage 18 to the air discharge hole 10 is blown into the passenger compartment after passing around the plurality of vortex generators 22. When the conditioned air passes around the plurality of vortex generators 22, the air flow passing along the plate surface of the vortex generators 22 separates from the outer edge, so that all-around separation vortices having various vortex axes are generated. As a result, as shown in FIG. 33, innumerable auxiliary vortices Vs are generated on the downstream side of the plurality of vortex generators 22 in the air flow. The auxiliary vortex Vs is generated on the downstream side of the vortex generator 22 in the air flow. The auxiliary vortex Vs differs from the lateral vortex Vt in at least the vortex rotation direction and the vortex axis direction of the vortex characteristics.

Therefore, on the downstream side of the outlet of the air discharge hole 10, the lateral vortex Vt is collided with the auxiliary vortex Vs having rotational direction and vortex axis different from those of the lateral vortex Vt. When the lateral vortex Vt and the auxiliary vortex Vs collide with each other, the lateral vortex Vt is greatly disturbed, and thus the lateral vortex Vt is difficult to be synthesized. That is, the development of the lateral vortex Vt generated downstream of the outlet of the air discharge hole 10 is suppressed. As a result, the air suction action in the working air flow Waf is suppressed, so that the working air flow Waf has a longer reach.

Further, the plurality of vortex generators 22 are arranged along the edge sides of the pair of long edges 102, and are not arranged on the edge sides of the pair of short edges 104. Therefore, the collision of the lateral vortex Vt and the auxiliary vortex Vs can be suppressed as compared with a case in which the vortex generators 22 are formed along the entire peripheral edge portion 100 of the air discharge hole 10. Thereby, aerodynamic noise generated by the collision of the lateral vortex Vt and the auxiliary vortex Vs can be reduced. Further, it is possible to suppress a decrease in the open area of the air discharge hole 10 due to the addition of the plurality of vortex generators 22.

Here, if the vortex generator 22 is formed directly with respect to the peripheral edge portion 100, an air flow is not generated at a contact portion where the vortex generator 22 and the peripheral edge portion 100 are in direct contact with each other, and the auxiliary vortex Vs cannot be generated at the contact portion.

In the present embodiment, the plurality of vortex generators 22 are supported inside the air discharge hole 10 by the support portion 23 extending in a predetermined direction perpendicular to the open direction of the air discharge hole 10 so as not to directly contact the peripheral edge portion 100. If the vortex generator 22 is supported by the support portion 23, the vortex generator 22 can be separated from the peripheral edge portion 100. In this case, the auxiliary vortex Vs can be generated in almost the entire outer peripheral edge of the vortex generator 22. Therefore, even if the lateral vortex Vt is generated between the vortex generator 22 and the peripheral edge portion 100, the auxiliary vortex Vs generated at the outer peripheral edge of the vortex generator 22 can suppress the development of the lateral vortex Vt.

In addition, the plurality of vortex generators 22 are plate-shaped members having a thickness in the open direction of the air discharge hole 10. According to this, the auxiliary vortex Vs is easily generated when the air flow passes between the vortex generators 22. As a result, the auxiliary vortex Vs easily collides with the lateral vortex Vt, so that the development of the lateral vortex Vt can be sufficiently suppressed.

The plate surface on the downstream air side of the plurality of vortex generators 22 is on the same surface as the end surface on the downstream air side of the peripheral edge portion 100 of the hole forming member 12. According to this, the position where the auxiliary vortex Vs is generated by the vortex generators 22 approaches the position where the lateral vortex Vt in the hole forming member 12 starts to occur. Therefore, the auxiliary vortex Vs easily collides with the lateral vortex Vt, and development of the lateral vortex Vt can be sufficiently suppressed.

(Modification of the Fifth Embodiment)

Figure 34:
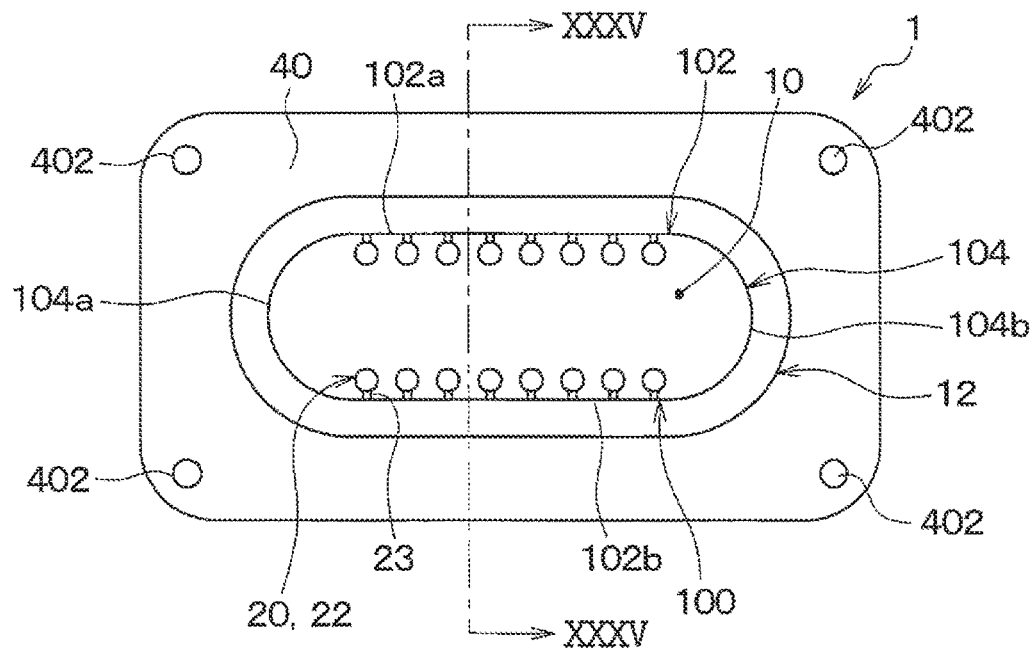
FIG. 34 is a schematic front view of an air discharge device according to a first modification of the fifth embodiment.
Figure 35:
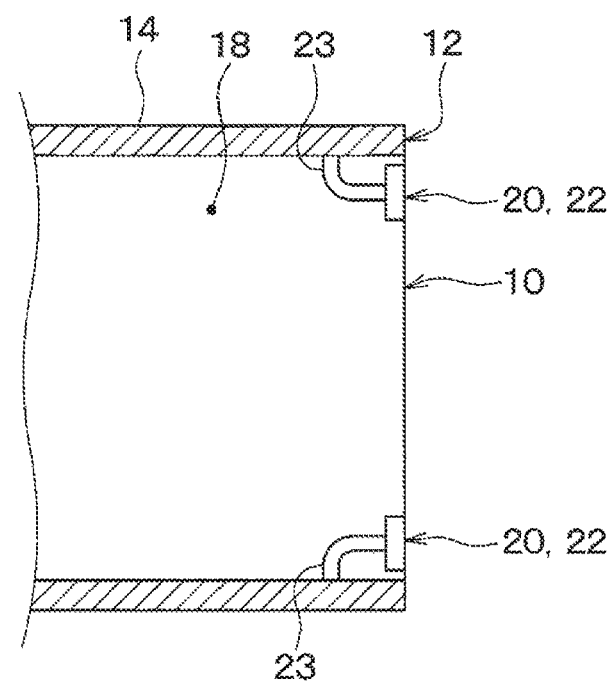
FIG. 35 is a cross-sectional view taken along a line XXXV-XXXV of FIG. 34.

The fifth embodiment described above exemplifies a case in which the plurality of vortex generators 22 are connected to the tip end of the rod-shaped support portion 23 protruding inward from the peripheral edge portion 100, but the present disclosure is not limited to this. For example, as shown in a first modification of FIGS. 34 and 35, each of the plurality of vortex generators 22 may be supported by a L-shaped support portion 23 extending in a L-shape from the inner wall surface of the duct 14 forming the flow passage 18 toward the air discharge hole 10.

Figure 36:
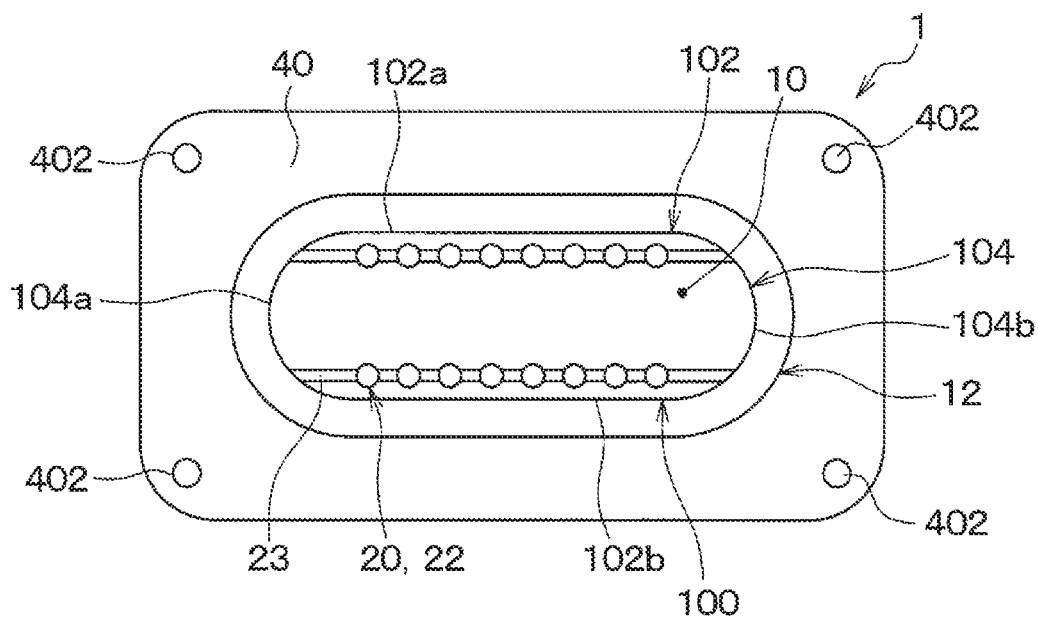
FIG. 36 is a schematic front view of an air discharge device according to a second modification of the fifth embodiment.

The fifth embodiment described above exemplifies a case where each of the plurality of vortex generators 22 is supported respectively by the separated support portion 23, but the present disclosure is not limited to this. For example, at least a part of the plurality of vortex generators 22 may be supported by a support portion 23 extending along the extending direction of the pair of long edges 102, as shown in a second modification of FIG. 36.

Figure 37:
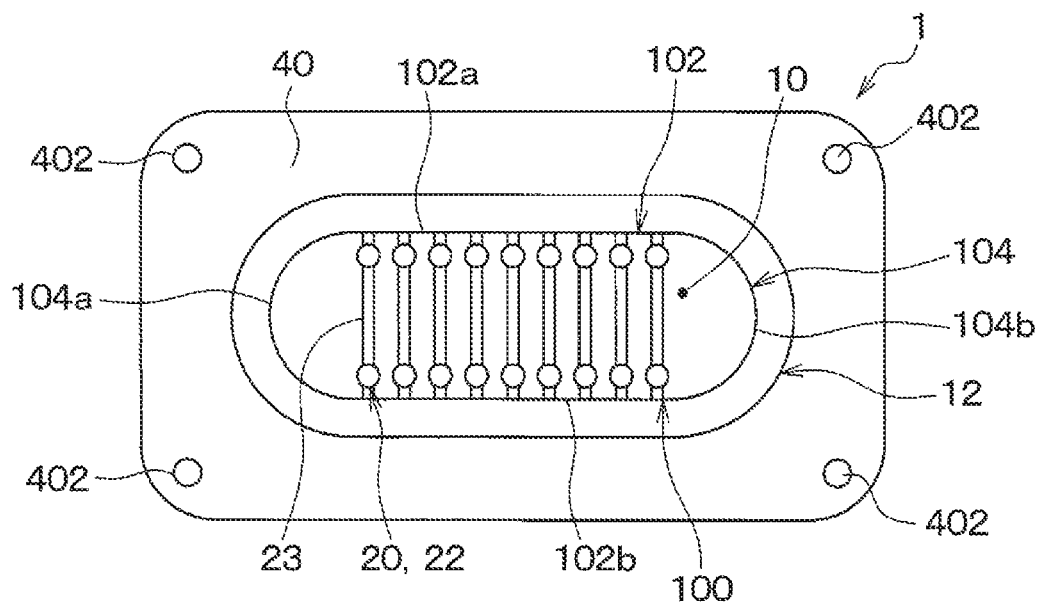
FIG. 37 is a schematic front view of an air discharge device according to a third modification of the fifth embodiment.

Alternatively, at least a part of the plurality of vortex generators 22 may be supported by a support portion 23 extending in a direction perpendicular to the extending direction of the pair of long edges 102, as shown in a third modification of FIG. 37.

Figure 38:
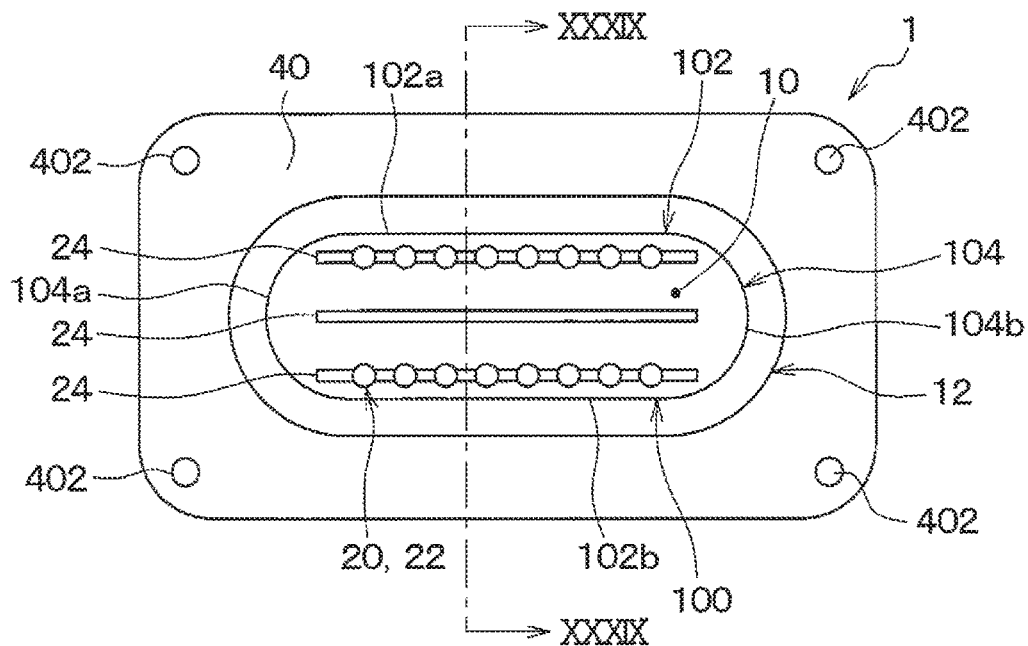
FIG. 38 is a schematic front view of an air discharge device according to a fourth modification of the fifth embodiment.
Figure 39:
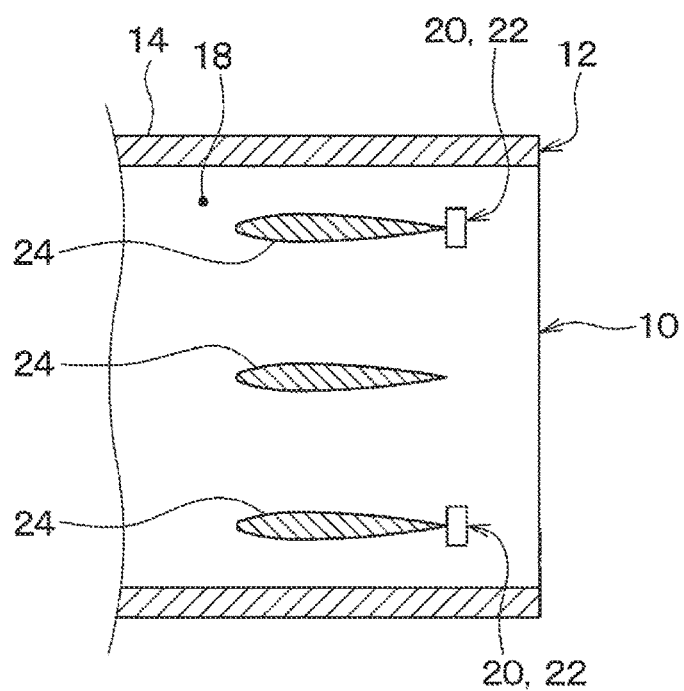
FIG. 39 is a cross-sectional view taken along line XXXIX-XXXIX in FIG. 38.

Alternatively, as shown in a fourth modification of FIGS. 38 and 39, in a case where a louver 24 for adjusting the air flow direction or the air volume is arranged inside the air discharge hole 10 or in the flow passage 18, the louver 24 may be configured to support a plurality of vortex generators 22. In this case, the louver 24 constitutes a support portion that supports the plurality of vortex generators 22. According to this, even if the posture of the louver 24 is changed to change the air flow direction or the like, the postures of the plurality of vortex generators 22 can be changed following the change of the louver 24. In this case, the postures of the plurality of vortex generators 22 can be changed according to the change in the air flow direction without providing a dedicated mechanism.

Figure 40:
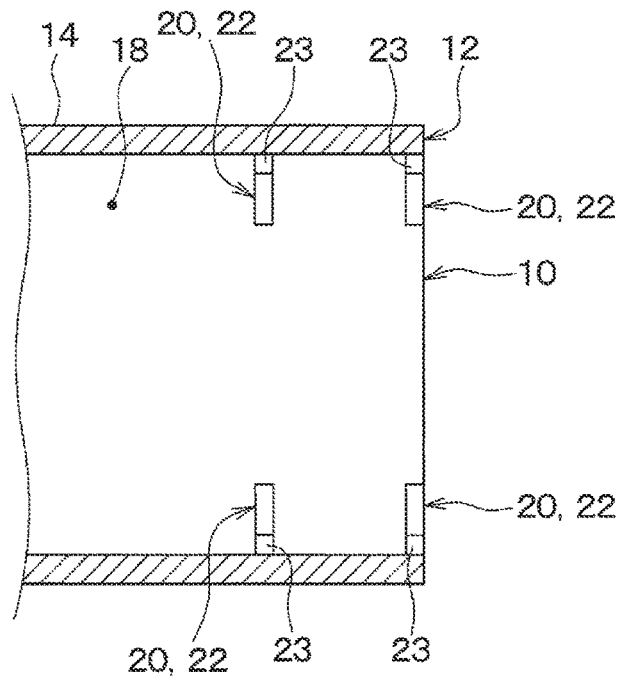
FIG. 40 is a schematic front view of an air discharge device according to a fifth modification of the fifth embodiment.

In the above-described fifth embodiment, the plurality of vortex generators 22 are configured by plate-shaped members having a thickness in the open direction of the air discharge hole 10, and the plate surfaces of the plurality of vortex generators 22 are positioned on the same surface as the end surface where the air discharge hole 10 in the hole forming member 12 opens. However, the present disclosure is not limited to this. For example, even when the plurality of vortex generators 22 are formed of plate-shaped members, the plate surfaces of the plurality of vortex generators 22 may be positioned on a surface different from the end surface of the air discharge hole 10 in the hole forming member 12. Alternatively, the plurality of vortex generators 22 may be arranged side by side in the open direction of the air discharge hole 10, as shown in the fifth modification of FIG. 40. In this case, the plurality of vortex generators 22 may be arranged to overlap each other in the open direction of the air discharge hole 10 or may be arranged so as not to overlap each other.

In the above-described fifth embodiment, each of the vortex generators 22 is made of a disk-shaped member having a circular shape when viewed from the open direction of the air discharge hole 10, but the present disclosure is not limited to this. The plurality of vortex generators 22 may be configured by, for example, a member in which the plurality of vortex generators 22 have an elliptical or polygonal shape when viewed from the open direction of the air discharge hole 10. Further, the plurality of vortex generators 22 may be formed of, for example, a member having a circular shape, a conical shape, or a polygonal shape when viewed from a direction perpendicular to the open direction of the air discharge hole 10.

Figure 41:
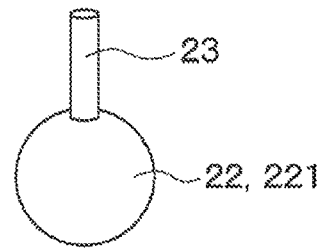
FIG. 41 is a schematic perspective view of a vortex generator according to a first modification of the fifth embodiment.
Figure 42:
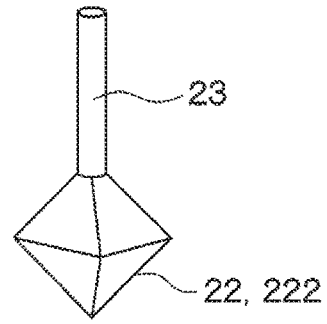
FIG. 42 is a schematic perspective view of a vortex generator according to a second modification of the fifth embodiment.
Figure 43:
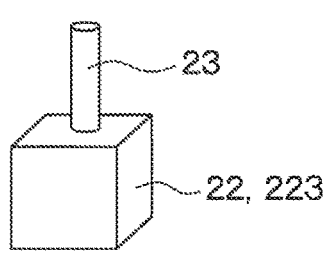
FIG. 43 is a schematic perspective view of a vortex generator according to a third modification of the fifth embodiment.
Figure 44:
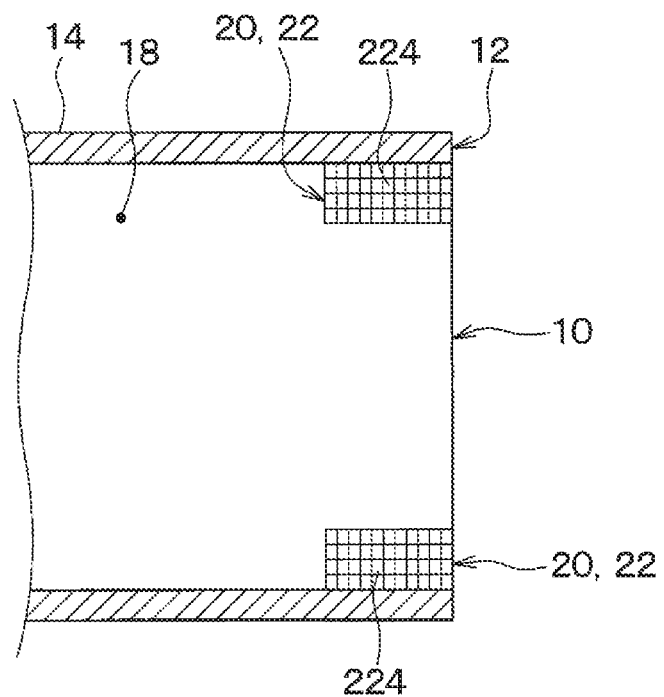
FIG. 44 is a schematic perspective view of a vortex generator according to a fourth modification of the fifth embodiment.

For example, each of the plurality of vortex generators 22 may be formed of a sphere 221 as shown in a first modification of FIG. 41. Alternatively, each of the plurality of vortex generators 22 may be configured by a polyhedron such as an octahedron 222 shown in a second modification of FIG. 42 and a hexahedron 223 shown in a third modification of FIG. 43. Furthermore, the plurality of vortex generators 22 may be made of a mesh body 224 formed in a mesh shape, as shown in a fourth modification of FIG. 44.

Further, in the above-described fifth embodiment, the vortex generation structure 20 in which the plurality of vortex generators 22 are formed has been described, but the vortex generation structure 20 is not limited to this. The vortex generation structure 20 may be configured to include at least one of the plurality of auxiliary holes 202 or the plurality of uneven portions 204 in addition to the plurality of vortex generators 22.

Sixth Embodiment

Next, a sixth embodiment will be described with reference to FIG. 45. The air discharge device 1 of this embodiment is different from the third embodiment in the open shape of the air discharge hole 10. In the present embodiment, a difference part different from the third embodiment will be mainly described, and description for a part similar to the third embodiment will be omitted.

Figure 45:
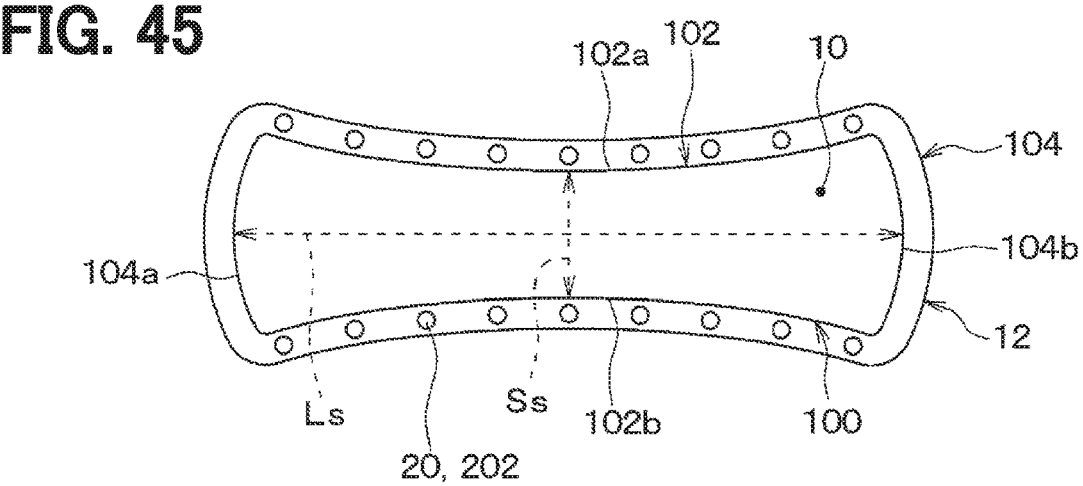
FIG. 45 is a diagram for explaining an open shape of an air discharge hole of an air discharge device according to a sixth embodiment.

As shown in FIG. 45, the air discharge hole 10 is configured to include a first edge 102a and a second edge 102b that form a pair of long edges 102, and a third edge 104a and a fourth edge 104b that form a pair of short edges 104.

A distance between the first edge 102a and the second edge 102b are different from each other in the direction of the long axis Ls. That is, the first edge 102a and the second edge 102b are curved so that the distance therebetween at the central portion in the direction of the long axis Ls is smaller than the distance therebetween at two ends in the direction of the long axis Ls.

On the other hand, the third edge 104a and the fourth edge 104b are curved so that the distance therebetween at the central portion in the direction of the short axis Ss is larger than the distance therebetween at two ends in the direction of the short axis Ss. Each of the third edge 104a and the fourth edge 104b has a length along the edge, shorter than that of the first edge 102a or the second edge 102b, and the distance between the third edge 104a and the fourth edge 104b is larger than the distance between the first edge 102a and the second edge 102b.

The third edge 104a is connected to one end of the first edge 102a and one end of the second edge 102b such that a connection portion of the third edge 104a connected with the first edge 102a or the second edge 102b has a roundness. Similarly, the fourth edge 104b is connected to the other end of the first edge 102a and the other end of the second edge 102b such that a connection portion of the fourth edge 104a connected with the first edge 102a or the second edge 102b has a roundness.

The air discharge hole 10 configured in this manner has a deformed oval shape with roundness connections in which the first edge 102a and the second edge 102b are connected to the third edge 104a and the fourth edge 104b. In this case, as compared with a case where the air discharge hole 10 includes a corner portion, the development of the lateral vortex Vt near the downstream side of the air discharge hole 10 can be more easily suppressed.

(Modification of Sixth Embodiment)

In the above-described sixth embodiment, the air discharge hole 10 is curved so that the distance between the central portions of the first edge 102a and the second edge 102b is smaller than the distance between the first edge 102a and the second edge 102b at the two end sides in the direction of the long axis Ls; however, the present disclosure is not limited this.

Figure 46:
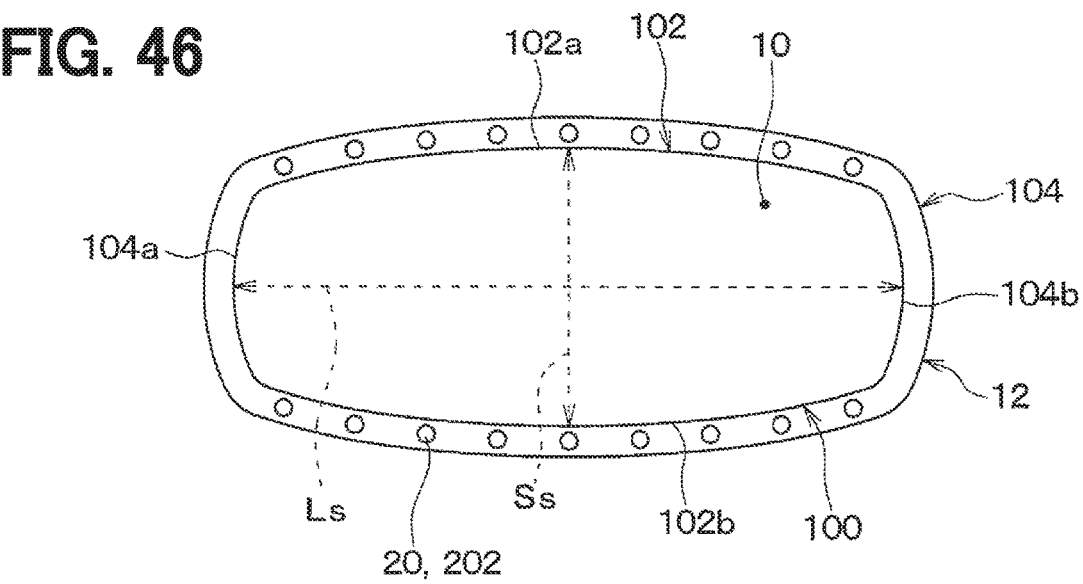
FIG. 46 is a diagram for explaining an air discharge hole according to a first modification of the sixth embodiment.

For example, as shown in a first modification of FIG. 46, the first edge 102a and the second edge 102b of the air discharge hole 10 may be curved such that the distance between the central portions of the first edge 102a and the second edge 102b is larger than the distance between the first edge 102a and the second edge 102b at the two end sides in the direction of the long axis Ls.

Figure 47:
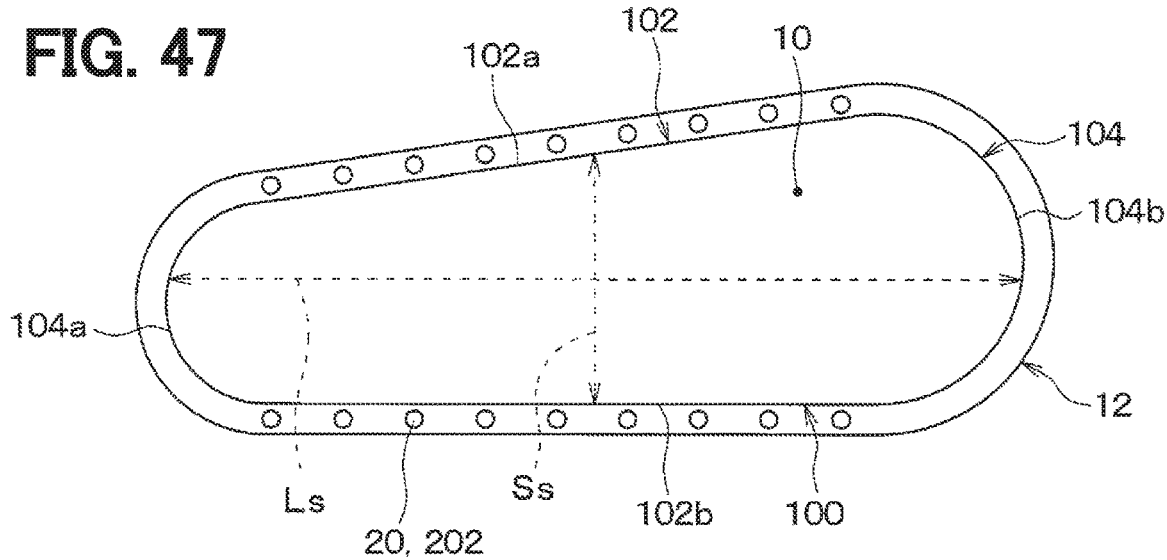
FIG. 47 is a diagram for explaining an air discharge hole according to a second modification of the sixth embodiment.

Alternatively, as shown in a second modification of FIG. 47, the first edge 102a and the second edge 102b of the air discharge hole 10 may be curved such that the distance between one end sides of the first edge 102a and the second edge 102b is larger than the distance between the other end sides of the first edge 102a and the second edge 102b.

Figure 48:
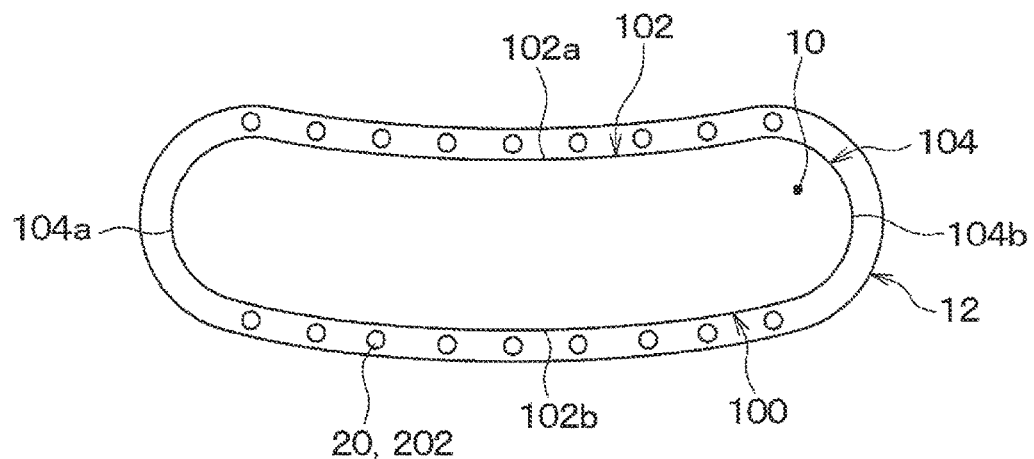
FIG. 48 is a diagram for explaining an air discharge hole according to a third modification of the sixth embodiment.

Further, for example, as shown in a third modification of FIG. 48, the first edge 102a and the second edge 102b of the air discharge hole 10 may be curved in the same direction, so that the distance between the first edge 102a and the second edge 102a is kept constant.

Figure 49:
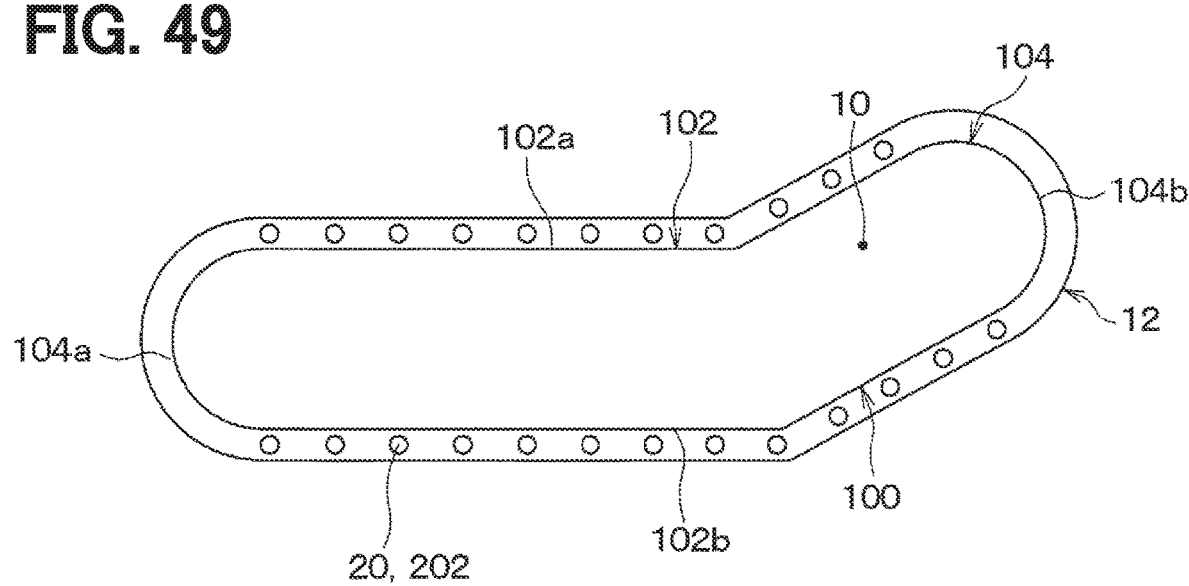
FIG. 49 is a diagram for explaining an air discharge hole according to a fourth modification of the sixth embodiment.

Alternatively, for example, as shown in a fourth modification of FIG. 49, the first edge 102a and the second edge 102b of the air discharge hole 10 may be bent in the same direction, so that the distance between the first edge 102a and the second edge 102a is kept constant.

Figure 50:
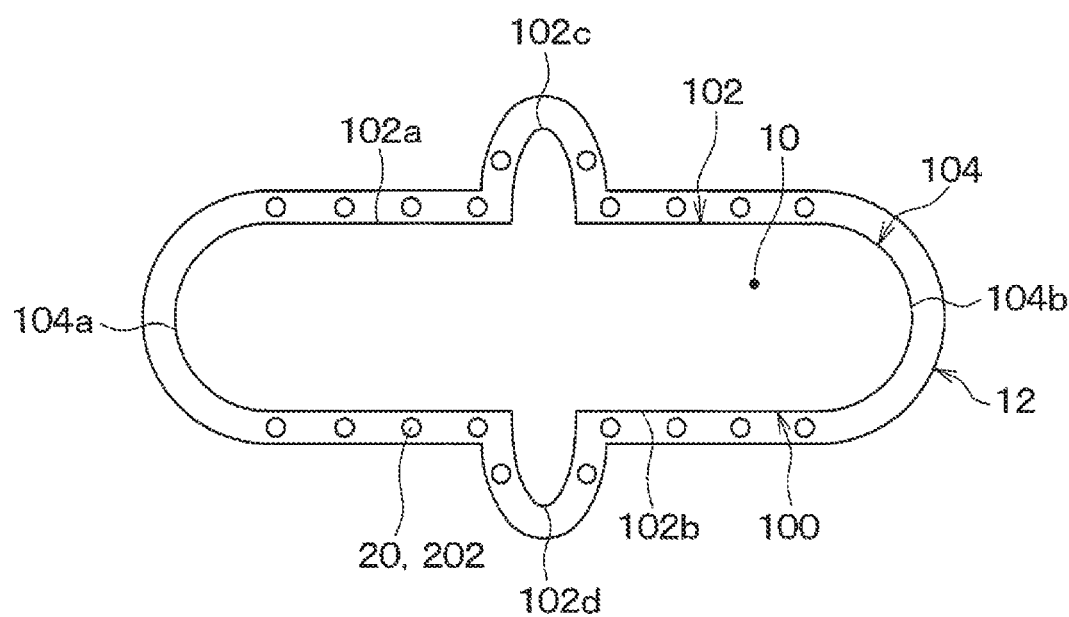
FIG. 50 is a diagram for explaining an air discharge hole according to a fifth modification of the sixth embodiment.

Alternatively, for example, as shown in a fifth modification of FIG. 50, the first edge 102a and the second edge of the air discharge hole 10 may be provided with recesses 102c and 102d that are recessed away from the first edge 102a and the second edge 102b.

Figure 51:
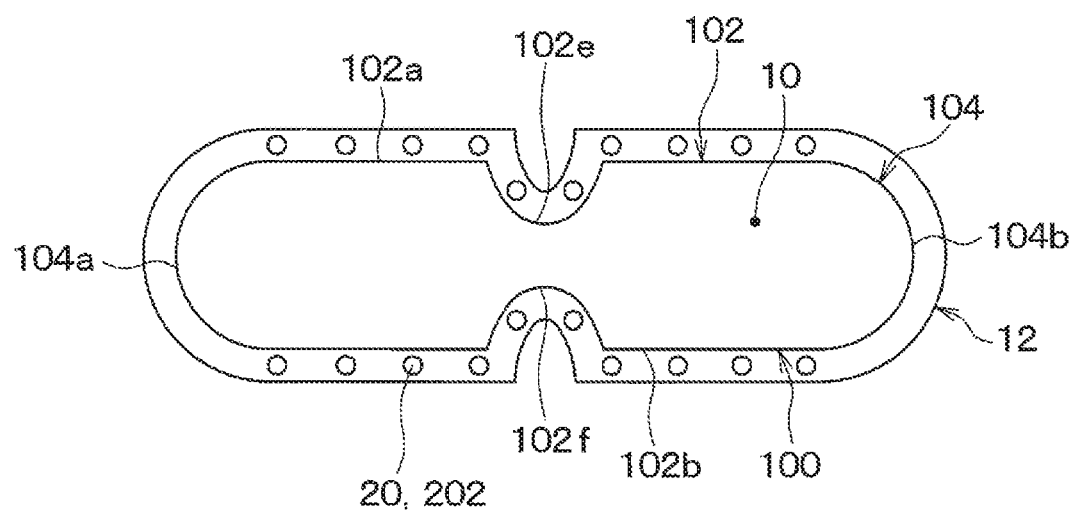
FIG. 51 is a diagram for explaining an air discharge hole according to a sixth modification of the sixth embodiment.

Alternatively, for example, as shown in a sixth modification of FIG. 51, the first edge 102*a* and the second edge 102*b* of the air discharge hole 10 may be provided with protrusions 102*e* and 102*f* that protrude with each other.

Here, the modifications described above exemplify a part of the open shapes of the air discharge hole 10, and a shape other than the above may be adopted as the open shape of the air discharge hole 10.

Further, in the sixth embodiment and its modifications, the open shape of the air discharge hole 10 in the air discharge device 1 in which the vortex generation structure 20 is made of the plurality of auxiliary holes 202 is illustrated, but the present disclosure is not limited to this. The open shape of the air discharge hole 10 shown in the sixth embodiment and its modifications is also applicable to the air discharge device 1 in which the vortex generation structure 20 is made of a plurality of uneven portions 204 or a plurality of vortex generators 22.

Other Embodiments

The present disclosure is not limited to the typical embodiments of the present disclosure described herein, but may include various modifications, such as following configurations.

In the above-described embodiment, an example in which the auxiliary hole 202 is formed in a circular shape has been described, but the shape is not limited to this. For example, the auxiliary hole 202 may be formed in an elliptical shape or a polygonal shape. In addition, as shown in the first modification of the third embodiment, the auxiliary hole 202 may be formed in a slit shape.

Further, in the above-described embodiment, an example in which a pair of straight long edges 102 and a pair of arcuate short edges 104 are connected to form the open shape of the air discharge hole 10 is described; however, the open shape of the air discharge hole 10 is not limited to this. For example, the open shape of the air discharge hole 10 may be formed by connecting a pair of arc-shaped long edges 102 and a pair of straight line short edges 104 in series. Further, as shown in the second modification of the third embodiment, the open shape of the air discharge hole 10 may be formed in a rectangular shape made of a pair of straight long edges 102 and a pair of straight short edges 104.

In the above-described embodiment, an example in which the open shape of the air discharge hole 10 is formed in a flat shape has been described, but the shape is not limited to this. For example, the open shape of the air discharge hole 10 may be formed in a circular shape, an elliptical shape, or a polygonal shape.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like.

(Overview)

According to an aspect of the present disclosure shown in a part or of all of the above embodiments and modifications thereof, an air discharge device includes a duct that defines a flow passage through which a working air flow passes, and a hole forming member defining an air discharge hole as an outlet of the working air flow at a downstream end of the duct in an air flow direction. The hole forming member has a vortex generation structure configured to generate an auxiliary vortex having a vortex characteristic that includes a vortex rotation direction and a vortex axis direction, different from that of the lateral vortex. The vortex generation structure is provided in the hole forming member so that the auxiliary vortex collides with the lateral vortex in a state where at least one of the vortex rotation direction and the vortex axial direction of the vortex characteristic is different from that of the lateral vortex.

According to a second aspect, the vortex generation structure includes a plurality of auxiliary holes provided side by side along a peripheral edge portion surrounding the air discharge hole, and the plurality of auxiliary holes are configured to generate auxiliary vortices by air flow blown out from the plurality of auxiliary holes. The auxiliary vortex is different from the lateral vortex at least in a vortex rotation direction. The auxiliary vortex generated by this structure collides with the lateral vortex, so that development of the lateral vortex can be suppressed. As a result, the suction action of the air drawn into the working air flow discharged from the air discharge hole is suppressed, and the working air flow blown out of the air discharge hole has a longer reach.

According to a third aspect, the peripheral edge portion includes a first edge and a second edge that are opposed to each other and extend with a predetermined distance therebetween, a third edge connecting one ends of the first edge and the second edge, and a fourth edge connecting the other ends of the first edge and the second edge. The first edge and the second edge configure a pair of long edges facing each other with a distance therebetween, smaller than a distance between the third edge and the fourth edge. The third edge and the fourth edge configure a pair of short edges facing each other with a distance therebetween, larger than the distance between the first edge and the second edge. The plurality of auxiliary holes are provided in the peripheral edge portion mainly on the edge sides of the pair of long edges so that the plurality of auxiliary vortices are less likely to be generated on the edge sides of the pair of short edges than on the edge sides of the pair of long edges. According to this, as compared with a case where the auxiliary holes are formed along the entire peripheral edge portion of the air discharge hole, the collision of the lateral vortex and the auxiliary vortex can be suppressed. In this case, a reaching distance of the working air flow can be made long while aerodynamic noise caused by the collision of the auxiliary vortex and the lateral vortex can be reduced.

According to a fourth aspect, the air discharge hole has a flat open shape, and the peripheral edge portion of the air discharge hole includes a pair of long edges and a pair of short edges continuously connected with the pair of long edges. The plurality of auxiliary holes are provided to be biased on edge sides of the pair of long edges. Therefore, the collision of the lateral vortex and the auxiliary vortex can be suppressed as compared with a case in which the auxiliary holes are provided along the entire peripheral edge portion of the air discharge hole. As a result, it is possible to reduce the aerodynamic noise generated by the collision of the lateral vortex and the auxiliary vortex while suitably increasing the reaching distance of the working air flow.

According to a fifth aspect, the plurality of auxiliary holes are provided on the edge sides of the pair of long edges, and are not formed on the edge sides of the pair of short edges. Therefore, in the hole forming member, the pair of short edges do not require a forming portion for forming the auxiliary hole. As a result, it is possible to reduce the aerodynamic noise and reduce the size of the hole forming member while suitably increasing the reaching distance of the working air flow, and it is possible to obtain an effect of improving installation flexibility and mounting flexibility of the air discharge device.

According to a sixth aspect, the vortex generation structure includes a plurality of uneven portions configured by alternately arranging concave portions and convex portions along the peripheral edge portion of the air discharge hole, to generate auxiliary vortices when air passes through between the concave portion and the convex portion. The auxiliary vortex has a vortex rotation direction and vortex axis direction different from that of a lateral vortex. The auxiliary vortex generated by this structure collides with the lateral vortex, so that development of the lateral vortex can be suppressed without greatly disturbing the working air flow. As a result, the suction action of the air drawn into the working air flow discharged from the air discharge hole is suppressed, and the working air flow blown out of the air discharge hole has a longer reach.

According to a seventh aspect, the peripheral edge portion includes a first edge and a second edge that face to each other and extend with a predetermined distance therebetween, a third edge connecting one ends of the first edge and the second edge, and a fourth edge connecting the other ends of the first edge and the second edge. The first edge and the second edge configure a pair of long edges facing each other with a distance therebetween, smaller than a distance between the third edge and the fourth edge. The third edge and the fourth edge configure a pair of short edges facing each other with a distance therebetween, larger than the distance between the first edge and the second edge. The plurality of uneven portions are provided in the peripheral edge portion mainly on the edge sides of the pair of long edges so that the plurality of auxiliary vortices are less likely to be generated on the edge sides of the pair of short edges than on the edge sides of the pair of long edges. According to this, as compared with a case where the uneven portion is formed along the entire peripheral edge portion of the air discharge hole, the collision of the lateral vortex and the auxiliary vortex can be suppressed. In this case, a reaching distance of the working air flow can be made suitably long while aerodynamic noise caused by the collision of the auxiliary vortex and the lateral vortex can be reduced.

According to an eighth aspect, the air discharge hole has a flat open shape, and the peripheral edge portion of the air discharge hole includes a pair of long edges and a pair of short edges continuously connected with the pair of long edges. The plurality of uneven portions are provided to be biased on edge sides of the pair of long edges. Therefore, the collision of the lateral vortex and the auxiliary vortex can be suppressed as compared with a case in which the uneven portions are provided along the entire peripheral edge portion of the air discharge hole. As a result, it is possible to reduce the aerodynamic noise generated by the collision of the lateral vortex and the auxiliary vortex while suitably increasing the reaching distance of the working air flow.

According to a ninth aspect, the plurality of uneven portions are formed on the edge sides of the pair of long edges, and are not formed on the edge sides of the pair of short edges. Therefore, in the hole forming member, the pair of short edges do not require a forming portion for forming the uneven portion. As a result, it is possible to reduce the aerodynamic noise and reduce the size of the hole forming member while suitably increasing the reaching distance of the working air flow, and it is possible to obtain an effect of improving installation flexibility and mounting flexibility of the air discharge device.

According to a tenth aspect, the plurality of uneven portions are formed in a plate shape having a thickness in the air flow direction. In this case, the auxiliary vortex is more likely generated when the air passes between the uneven portions, as compared with a case where the multiple uneven portions are formed to extend to a flange. As a result, the suction action of the air drawn into the working air flow discharged from the air discharge hole is suppressed, and the working air flow blown out of the air discharge hole has a longer reach.

According to an eleventh aspect, a plate surface on the downstream air side of the plurality of uneven portions is on the same surface as the end surface on the downstream air side of the peripheral edge portion of the hole forming member. According to this, the position where the auxiliary vortex is generated by the uneven portion approaches the position where the lateral vortex in the hole forming member starts to occur. Therefore, the auxiliary vortex easily collides with the lateral vortex, and development of the lateral vortex can be sufficiently suppressed.

According to a twelfth aspect, the vortex generation structure is configured to include a plurality of vortex generators that are arranged side by side along the peripheral edge portion of the hole forming member defining the air discharge hole. The vortex generation structure is configured such that, when the air passes around the vortex generator, the auxiliary vortex that is different from the lateral vortex in at least one of the rotational direction of the vortex and the direction of the vortex axis is generated. The auxiliary vortex generated by this structure collides with the lateral vortex, so that development of the lateral vortex can be suppressed without greatly disturbing the working air flow. As a result, the suction action of the air drawn into the working air flow discharged from the air discharge hole is suppressed, and the working air flow blown out of the air discharge hole has a longer reach.

According to a thirteenth aspect, the plurality of vortex generators are supported by a support portion inside the air discharge hole so as not to directly contact the peripheral edge portion. If the vortex generator is supported by the support portion, the vortex generator can be separated from the peripheral edge portion. It is possible to generate auxiliary vortices even between the vortex generator and the peripheral edge portion. Thus, even if a lateral vortex occurs between the vortex generator and the peripheral edge portion, the development of the lateral vortex can be effectively suppressed.

According to a fourteenth aspect, the peripheral edge portion includes a first edge and a second edge that face to each other and extend with a predetermined distance therebetween, a third edge connecting one ends of the first edge and the second edge, and a fourth edge connecting the other ends of the first edge and the second edge. The first edge and the second edge configure a pair of long edges facing each other with a distance therebetween, smaller than a distance between the third edge and the fourth edge. The third edge and the fourth edge configure a pair of short edges facing each other with a distance therebetween, larger than the distance between the first edge and the second edge. The plurality of vortex generators are provided in the peripheral edge portion mainly on the edge sides of the pair of long edges so that the plurality of auxiliary vortices are less likely to be generated on the edge sides of the pair of short edges than on the edge sides of the pair of long edges. According to this, as compared with a case where the vortex generators are formed along the entire peripheral edge portion of the air discharge hole, the collision of the lateral vortex and the auxiliary vortex can be suppressed. In this case, a reaching distance of the working air flow can be made long while aerodynamic noise caused by the collision of the auxiliary vortex and the lateral vortex can be reduced.

According to a fifteenth aspect, the plurality of vortex generators are formed on the edge sides of the pair of long edges, and are not formed on the edge sides of the pair of short edges. Thus, it is possible to suppress a decrease in the open area of the air discharge hole due to the addition of the plurality of vortex generators.

According to a sixteenth aspect, the plurality of vortex generators are plate-shaped members having a thickness in an open direction of the air discharge hole. According to this, the auxiliary vortex is easily generated when the airflow passes between the vortex generators. As a result, the auxiliary vortex easily collides with the lateral vortex, so that the development of the lateral vortex can be sufficiently suppressed. The open direction is the normal direction of the surface surrounded by the edge of the air discharge hole.

According to a seventeenth aspect, a plate surface on the downstream air side of the plurality of vortex generators is on the same surface as an end surface on the downstream air side of the peripheral edge portion of the hole forming member. According to this, the position where the auxiliary vortex is generated by the vortex generator approaches the position where the lateral vortex in the hole forming member starts to occur. Therefore, the auxiliary vortex easily collides with the lateral vortex, and development of the lateral vortex can be sufficiently suppressed.

What is claimed is:

1. An air discharge device comprising:
a duct defining a flow passage through which a working air flow passes to be blown toward a discharge target; and
a hole forming member defining an air discharge hole located at a downstream air side of the duct, as an air outlet from which the working air flow is blown out, wherein
the hole forming member has a vortex generation structure configured to generate an auxiliary vortex having a vortex characteristic including a vortex rotation direction and a vortex axis direction, different from that of a lateral vortex generated by the working air flow at a downstream air side of the air discharge hole,
the vortex generation structure is configured in the hole forming member such that the auxiliary vortex collides with the lateral vortex in a state where at least one of the vortex rotation direction and the vortex axial direction of the vortex characteristic of the auxiliary vortex is different from that of the lateral vortex,
the vortex generation structure includes a plurality of auxiliary holes arranged along a peripheral edge portion of the hole forming member surrounding the air discharge hole, and the plurality of auxiliary holes are configured to generate a plurality of the auxiliary vortices different from the lateral vortices in at least one of the vortex rotation direction and the vortex axial direction,
the peripheral edge portion of the hole forming member surrounding the air discharge hole includes a first edge and a second edge that are opposed to each other and extend with a predetermined distance therebetween, a third edge connecting one ends of the first edge and the second edge, and a fourth edge connecting the other ends of the first edge and the second edge,
the first edge and the second edge configure a pair of long edges facing each other with a distance therebetween, smaller than a distance between the third edge and the fourth edge,
the third edge and the fourth edge configure a pair of short edges facing each other with a distance therebetween, larger than the distance between the first edge and the second edge,
the plurality of auxiliary holes are provided in the peripheral edge portion of the hole forming member surrounding the air discharge hole mainly on the edge sides of the pair of long edges such that the plurality of auxiliary vortices are less likely to be generated on the edge sides of the pair of short edges than on the edge sides of the pair of long edges, and
an inner wall surface of each of the plurality of auxiliary holes from an upstream end to a downstream end is parallel with an inner wall surface of the duct separating an auxiliary air flow from the working air flow.

2. The air discharge device according to claim 1, wherein the air discharge hole has a flat open shape,
the peripheral edge portion of the hole forming member surrounding the air discharge hole includes the pair of long edges facing each other in a short axial direction, and the pair of short edges facing each other in a long axial direction and continuously connected with the pair of long edges, the short edge having a length smaller than a length of the long edge.

3. The air discharge device according to claim 1, wherein the plurality of auxiliary holes are provided in the pair of long edges and are not provided in the pair of short edges.

4. The air discharge device according to claim 1, wherein the third edge and the fourth edge configure a pair of curved short edges facing each other with the distance therebetween larger than the distance between the first edge and the second edge.

5. The air discharge device according to claim 1, wherein the air discharge hole has an elliptical shape.

6. An air discharge device comprising:
a duct defining a flow passage through which a working air flow passes to be blown toward a discharge target; and
a hole forming member defining an air discharge hole located at a downstream air side of the duct, as an air outlet from which the working air flow is blown out, wherein
the hole forming member has a vortex generation structure configured to generate an auxiliary vortex having a vortex characteristic including a vortex rotation direction and a vortex axis direction, different from that of a lateral vortex generated by the working air flow at a downstream air side of the air discharge hole,
the vortex generation structure is configured in the hole forming member such that the auxiliary vortex collides with the lateral vortex in a state where at least one of the vortex rotation direction and the vortex axial direction of the vortex characteristic of the auxiliary vortex is different from that of the lateral vortex, the vortex generation structure includes a plurality of auxiliary holes arranged along a peripheral edge portion of the hole forming member surrounding the air discharge hole, and the plurality of auxiliary holes are configured to generate a plurality of the auxiliary vortices different from the lateral vortices in at least one of the vortex rotation direction and the vortex axial direction, the air discharge hole has a flat open shape, the peripheral edge portion of the hole forming member surrounding the air discharge hole includes a pair of long edges facing each other in a short axial direction, and a pair of short edges facing each other in a long axial direction and continuously connected with the pair of long edges, the short edge having a length smaller than a length of the long edge, the plurality of auxiliary holes are provided in the peripheral edge portion of the hole forming member surrounding the air discharge hole mainly in the pair of long edges such that the plurality of auxiliary vortices are less likely to be generated on the edge sides of the pair of short edges than on the edge sides of the pair of long edges, and an inner wall surface of each of the plurality of auxiliary holes from an upstream end to a downstream end is parallel with an inner wall surface of the duct separating an auxiliary air flow from the working air flow.

7. The air discharge device according to claim 6, wherein the peripheral edge portion of the hole forming member surrounding the air discharge hole includes the pair of long edges facing each other in the short axial direction, and a pair of curved short edges facing each other in the long axial direction and continuously connected with the pair of long edges.

* * * * *